United States Patent
Ma et al.

(10) Patent No.: US 10,020,852 B2
(45) Date of Patent: Jul. 10, 2018

(54) SCHNORR-EUCHNER EXPANSIONS AND THEIR FAST IMPLEMENTATIONS

(71) Applicant: Georgia Tech Research Corporation, Atlanta, GA (US)

(72) Inventors: Xiaoli Ma, Norcross, GA (US); Qi Zhou, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/025,027

(22) PCT Filed: Sep. 3, 2014

(86) PCT No.: PCT/US2014/053889
§ 371 (c)(1),
(2) Date: Mar. 25, 2016

(87) PCT Pub. No.: WO2015/047678
PCT Pub. Date: Apr. 2, 2015

(65) Prior Publication Data
US 2016/0241311 A1    Aug. 18, 2016

Related U.S. Application Data

(60) Provisional application No. 61/882,919, filed on Sep. 26, 2013, provisional application No. 61/909,429, filed on Nov. 27, 2013.

(51) Int. Cl.
*H04J 3/02* (2006.01)
*G06F 15/173* (2006.01)
(Continued)

(52) U.S. Cl.
CPC ............. *H04B 7/0413* (2013.01); *H04B 7/01* (2013.01); *H04B 7/08* (2013.01); *H04L 67/16* (2013.01)

(58) Field of Classification Search
CPC ... H04L 12/1859; H04L 51/32; H04L 51/046; H04L 67/16; H04L 51/00; H04L 65/4076;
(Continued)

(56) References Cited

U.S. PATENT DOCUMENTS 6,466,592 B1 * 10/2002 Chapman ............. H04N 21/235
                                                                370/537
7,012,891 B1 *  3/2006 Chandran ............... H04L 12/18
                                                                370/230
(Continued)

FOREIGN PATENT DOCUMENTS

WO        2012156096 A1    11/2012

OTHER PUBLICATIONS

Agrell, E. et al., Closest Point Search in Lattices, IEEE Trans. Info. Theor., 48, 8, 2002, pp. 2201-2214.
(Continued)

*Primary Examiner* — Sam K Ahn
*Assistant Examiner* — Sarah Hassan
(74) *Attorney, Agent, or Firm* — Troutman Sanders LLP; Ryan A. Schneider; Dan Li

(57) ABSTRACT

Methods and apparatus reducing or eliminating the number of multipliers in Schnorr-Euchner expansion algorithms are disclosed. Methods and apparatus for implementing Schnorr-Euchner expansion algorithms with a reduced number of multipliers or without any multipliers are also disclosed. Also disclosed is a Schnorr-Euchner expansion method for a multiple-input multiple-output communication system. The method includes receiving, by a plurality of input terminals, a plurality of input signals. The method also includes detecting a symbol transmitted by each input signal. The detection includes identifying a list of possible symbols that may be transmitted by each input signal. A cost value for each possible symbol is determined based on a cost
(Continued)

function. The cost function is implemented without requiring a multiplier. The possible symbol with a lowest cost value is identified as the transmitted symbol.

14 Claims, 14 Drawing Sheets

(51) Int. Cl.
*H04B 7/0413* (2017.01)
*H04B 7/01* (2006.01)
*H04L 29/08* (2006.01)
*H04B 7/08* (2006.01)

(58) Field of Classification Search
CPC ..... H04L 12/18; H04L 29/08; H04L 43/0858; H04L 65/00
USPC .......................................... 370/537; 709/223
See application file for complete search history.

(56) References Cited

U.S. PATENT DOCUMENTS

| | | | | |
|---|---|---|---|---|
| 8,015,271 | B2* | 9/2011 | McKeown | H04L 12/2801 709/223 |
| 8,307,110 | B1* | 11/2012 | Katzer | H04L 12/1859 709/219 |
| 2004/0054572 | A1* | 3/2004 | Oldale | G06F 17/30699 706/1 |
| 2006/0146965 | A1 | 7/2006 | Kwun et al. | |
| 2007/0116143 | A1 | 5/2007 | Bjerke et al. | |
| 2008/0126303 | A1* | 5/2008 | Park | G06F 17/30828 |
| 2008/0153444 | A1* | 6/2008 | Chen | H04L 1/0047 455/205 |
| 2008/0279298 | A1 | 11/2008 | Ben-Yishai et al. | |
| 2010/0014606 | A1 | 1/2010 | Chen et al. | |
| 2010/0088265 | A1* | 4/2010 | Pohl | G06Q 30/02 706/46 |
| 2011/0007851 | A1 | 1/2011 | Li | |
| 2011/0295762 | A1* | 12/2011 | Scholz | G06Q 30/0282 705/347 |
| 2012/0134451 | A1* | 5/2012 | Patel | H04B 7/0456 375/341 |
| 2013/0128783 | A1* | 5/2013 | Le Naour | H04W 52/02 370/281 |

OTHER PUBLICATIONS

Barbero L. G. et al., FPGA Design Considerations in the Implementation of a Fixed-Throughput Sphere Decoder for MIMO Systems, Inst. for Dig. Comm. Univ. of Edinburgh, IEEE, 2006, 6 pages.
Chen, S. et al., Relaxed K-Best MIMO Signal Detector Design and VLSI Implementation, IEEE Trans. Very Large Integ. (VLSI) Sys, 15, 3, 2007, pp. 328-337.
Gan, Y. H., Complex Lattice Reduction Algorithm for Low-Complexity Full-Diversity MIMO Detection, IEEE Trans. Sig. Proc., 57, 7, 2009, pp. 2701-2710.
Guo, Z. et al., A VLSI Architecture of the Schnorr-Euchner Decoder for MIMO Systems, IEEE 6th CAS Symp. on EmergingTech, 2004, pp. 65-68.
Guo, Z. et al., Algorithm and Implementation of the K-Best Sphere Decoding for MIMO Detection, IEEE J. Sel. Ar. Comm, 24, 3, 2006, pp. 491-503.
Hansen, M. et al, Near Optimal Detection in MIMO Systems Using Gibbs Sampling, IEEE Chem. Soc., 2009 proceedings, 6 pages.
Hassibi, A. et al., Integer Parameter Estimation in Linear Models with Applications to GPS, IEEE Trans. Sig. Proc., 46, 11, 1998, pp. 2938-2952.
Hochwald, B. M. et al., Achieving Near-Capacity on a Multiple-Antenna Channel, IEEE Trans. Comm., 51, 3, 2003, pp. 389-399.
Jalden, J. et al., DMT Optimality of LR-Aided Linear Decoders for a General Class of Channels, Lattice Designs, and System Models, IEEE Trans Info. Theor., 56, 10, 2010, pp. 4765-4780.
Jalden, J. et al., On the Complexity of Sphere Decoding in Digital Communications, IEEE Trans. Sig. Proc., 53, 4, 2005, pp. 1474-1484.
Larsson, Erik G., MIMO Detection Methods: How They Work, IEEE Sig. Proc. Mag., 91, 2009, pp. 91-95.
Lenstra, A. K. et al., Factoring Polynomials with Rational Coefficients, Math. Ann. 261, 1982, pp. 515-534.
Liang, Y.D. et al., On the Relationship Between MMSE-SIC and BI-GDFE Receivers for Large Multiple-Input Multiple-Dutput Channels, IEEE Trans. Sig. Proc., 56, 8, 2008, pp. 3627-3637.
Ling, C., On the Proximity Factors of Lattice Reduction-Aided Decoding, IEEE Trans. Sig. Proc., 59, 6, 2011, pp. 2795-2808.
Ma, X. et al., Performance Analysis for MIMO Systems with Lattice-Reduction Aided Linear Equalization, IEEE Trans. Comm., 56, 2, 2008, pp. 309-318.
Mandavi, M. et al. Novel MIMO Dectection Algorithm for High-Order Constellations in the Complex Domain, IEEE Trans. Very Large Integ. (VLSI) Sys, 21, 5, 2013, pp. 834-847.
Mondal, S. et al., Design and Implementation of a Sort-Free K-Best Sphere Decoder, IEEE Trans. Very Large Integ. (VLSI) Sys, 18, 10, 2010, pp. 1497-1501.
Qi, X. F., A Lattice-Reduction-Aided Soft Demapper for High-Rate Coded MIMO-OFDM Systems, IEEE Sig. Proc. Lett, 1, 5, 2007, pp. 305-308.
Rusek, E et al., Scaling Up MIMO Opportunities and Challenges with Very Large Arrays, IEEE Sig. Proc. Mag, 40, 2013, pp. 40-60.
Seethaler, D. et al., Low-Complexity MIMO Data Detection Using Seysen's Lattice Reduction Algorithm, Vienna Univ. of Tech., IEEE, 2007, pp. 53-56.
Shabany, M. et al., A 675 Mbps, 4 x 4 64-QAM K-Best MIMO Detector in 0.13 µm CMOS, IEEE Trans. Very Large Integ. (VLSI) Sys, 20, 1, 2012, pp. 135-147.
Shabany, M. et al., The Application of Lattice-Reduction to the K-Best Algorithm for Near-Optimal MIMO Detection, Univ. of Toronto, IEEE, 2008, pp. 316-319.
Srinidhi, N. et al, Layered Tabu Search Algorithm for Large-MIMO Detection and a Lower Bound on ML Performance, IEEE Trans Comm., 59, 11, 2011, pp. 2955-2963.
Srinidhi, N. et al, Low-Complexity Near-ML Decoding of Large Non-Orthogonal STBCs Using Reactive Tabu Search, IEEE ISIT, 2009, 5 pages.
Taherzadeh, Mahmoud et al., On the Limitations of the Naïve Lattice Decoding, IEEE Trans. Info. Theor., 56, 10, 2010, pp. 4820-4826.
Vardhan, K. V. et al., A Low-Complexity Detector for Large MIMO Systems and Multicarrier CDMA Systems, IEEE J. Sel. Ar. Comm., 26, 3, 2008, pp. 473-485.
Wang, X, Iterative (Turbo) Soft Interference Cancellation and Decoding for Coded CDMA, IEEE Trans on Com., 47, 7, 1999, pp. 1046-1061.
Wen, Q. et al, Fixed-Point Realization of Lattice-Reduction Aided MIMO Receivers with Complex K-Best Algorithm, IEEE, Ga. Inst. Tech, 2013, 5 pages.
Windpassinger, C. et al., Low-Complexity Near-Maximum-Likelihood Detection and Precoding for MIMO Systems Using Lattice Reduction, Univ. of Erlangen-Numberg, 2003, pp. 345-348.
Wubben, D. et al., MMSE Extension of V-BLAST Based on Sorted QR Decomposition, Univ. of Bremen, IEEE, 2003, pp. 508-512.
Yao, H. et al., Lattice-Reduction-Aided Detectors for MIMO Communication Systems, MIT, IEEE, 2002, pp. 424-428.
Zhang, L. et al., Efficient Complex Sphere Decoding Framework for Linear Dispersion Space-Time Block Codes, 18th Ann. IEEE Intl. Sym. Personal, Indoor and Mobile Radio Comm., 2007, 4 pages.
Zhou, Q. et al., An Improved LR-Aided K-Best Algorithm for MIMO Detection, IEEE, 2012, 5 pages.
Zhou, Q. et al., Designing Low-Complexity Detectors for Generalized SC-FDMA Systems, Ga Inst. Tech., 6 pages.
Zhou, Q. et al., Element-Based Lattice Reduction Algorithms for Large MIMO Detection, IEEE J. Sel. Ar. Comm, 31, 2, 2013, pp. 274-286.

(56) References Cited

OTHER PUBLICATIONS

Zhou, Q. et al., Improved Element-Based Lattice Reduction Algorithms for Wireless Communications, IEEE Trans. Wire. Comm., 12, 9, 2013, pp. 4414-4421.
Zhou, Q. et al., Robust Designs for Femtocell Networks with Interference from Macrocell Users, Ga. Inst. Tech., IEEE, 2011, pp. 214-218.
Zhou, Q. et al., Schnorr-Euchner Expansions Without Multipliers, School of Electrical and Computer Engineering, Georgia Institute of Technology (5 pages).
The International Search Report and Written Opinion in the related PCT Application No. PCT/US2014/053889 dated Oct. 7, 2015.
Search Report and Opinion from related European Application No. 14849568.2 dated Apr. 10, 2017 (11 pages).
Yang, et al., "A Flexible DSP Architecture for MIMO Sphere Decoding," IEEE Transactions on Circuits and Systems, Oct. 2009; pp. 2301-2314; vol. 56, No. 10.
Mondal, et al., "Architectural Optimizations for Low-Power K-Best MIMO Decoders," IEEE Transactions on Vehicular Technology, Sep. 2009; pp. 3145-3153; vol. 58, No. 7.
Guo, et al., "A 53.3 Mb/s 4x4 16-QAM MIMO Decoder in 0.35-μm CMOS," IEEE International Symposium on Circuits and Systems (ISCAS); May 23, 2005; pp. 4947-4950.
Barbero and Thompson, "FPGA Design Considerations in the Implementation of a Fixed-Throughput Sphere Decoder for MIMO Systems," Field Programmable Logic and Applicatinos, Aug. 28, 2006; pp. 1-6.

\* cited by examiner

SCHNORR-EUCHNER EXPANSIONS AND THEIR FAST IMPLEMENTATIONS

CROSS-REFERENCE TO RELATED APPLICATIONS

This application is a US National Stage of International Application No. PCT/US2014/053889, filed 3 Sep. 2014, which claims the benefit of U.S. Provisional Patent Application Ser. No. 61/882,919, entitle "Schnorr-Euchner Expansions without Multipliers," filed on Sep. 26, 2013, and U.S. Provisional Patent Application Ser. No. 61/909,429, entitled "Schnorr-Euchner Expansion Methods," filed on Nov. 27, 2013, each of which are incorporated herein by reference in their entirety as if fully set forth below.

TECHNICAL FIELD DISCLOSED

Embodiments of the disclosed technology generally relate to signal processing in multiple-input multiple-output ("MIMO") signal transmission detection. More particularly, the disclosed technology relates to Schnorr-Euchner expansion algorithms implemented in MIMO communications.

BACKGROUND DISCLOSED

Multiple-Input Multiple-Output ("MIMO") communication systems are becoming increasingly popular as a solution to increasing demands for higher data-rates and more reliable wireless communication systems. These systems can include multiple antennas at a transmitter side of the communication system and multiple antennas at the receiver side of the communication system. Each transmitter antenna can transmit a different signal at a common frequency through a different channel of the communication system. Each receiver antenna may receive each signal from the multiple transmitter-antennas. During transit, the transmitted signals may encounter different obstacles such that the frequency response of each channel is different. Thus, a common goal of conventional systems is to attempt to efficiently detect the transmitted symbols by determining the frequency response of each channel in the communication system.

Although the optimal solution to the MIMO symbol detection problem, Maximum Likelihood ("ML") detection, is known, a brute-force ML detector implementation involves an exhaustive search over all possible transmitted symbol vectors. This approach is infeasible for hardware implementations when either a large signal constellation or a large number of transmit and receive antennas are employed. Hence, a goal of conventional systems is to design hardware for MIMO symbol detection that achieves comparable Bit-Error-Rate ("BER") performance to the ML detector while having low hardware complexity and meeting throughput and latency requirements.

Some MIMO symbol detection systems employ methods of linear detection and Successive Interference Cancelation (SIC), Sphere Decoding (SD), Lattice Reduction (LR), and/or Complex Lenstra-Lenstra-Lovasz (CLLL) algorithms, among many other possibilities.

The Schnorr-Euchner (SE) method is a detection algorithm that searches a list of candidates for best guesses of the transmitted symbols. Each candidate is associated with a cost. The SE method ranks the candidates in the order of their cost function. The candidate with the smallest cost is considered as the best candidate. The SE method may be applied to or used in conjunction with, but not limited to, many algorithms including Sphere Decoding, lattice decoding applications, and may be used in other applications such as and global positioning systems (GPS). The SE method often includes two stages: an initialization stage and an expansion stage. The existing SE expansion method often requires multipliers to obtain the value of the cost function, where the multipliers can result in long critical path that lowers the maximum achievable frequency of a VLSI implementation. As a result, due to the use of multipliers, the existing SE method has a high cost in processing power and time. Therefore, there is a need for a more energy-efficient, accurate, and less complex SE method with enhanced performance. Various embodiments of the disclosed technology address these needs.

BRIEF SUMMARY DISCLOSED

The disclosed technology relates to SE expansions with reduced or without multipliers. One aspect of the disclosed technology relates to an SE expansion method for a multiple-input multiple-output communication system. The method may include receiving, by a plurality of input terminals, a plurality of input signals. Each input signal may transmit a symbol. The method may identify a list of possible symbols transmitted by each input signal. A cost value for each possible symbol may be determined based on a cost function. The cost function may be implemented without requiring a multiplier. The possible symbol with a lowest cost value may be identified as the transmitted symbol.

Another aspect of the disclosed technology relates to an apparatus that implements a Schnorr-Euchner expansion method without requiring a multiplier. The apparatus may include a plurality of input terminals each configured to receive a wireless signal. The apparatus may also include a processor in connection with the input terminals, where the processor may be configured to detect a symbol transmitted by each wireless signal. For instance, the processor may identify a list of possible symbols that may be transmitted by each wireless signal. The processor may determine a cost value for each possible symbol based on a cost function. The possible symbol with a lowest cost value may be identified as the transmitted symbol.

Yet another aspect of the disclosed technology relates to a multiple-input multiple-output communication system. The system may include a plurality of input terminals each configured to receive an input signal. The system may also include an integrated circuit implementing an Schnorr-Euchner expansion algorithm without requiring a multiplier. The integrated circuit may be configured to detect a symbol transmitted by each input signal. For instance, the circuit may estimate a list of possible symbols that may be transmitted by the input signal. The circuit may determine a cost value for each possible symbol based on a cost function. The possible symbol with a lowest cost value may be identified as the transmitted symbol.

Further, an exemplary embodiment of the disclosed technology provides a SE expansion that reduces the number of multipliers for the crossing multiplication. In one embodiment, the SE expansion method does not need any multiplier for $l_1$ cost function.

In another exemplary embodiment of the disclosed technology, an SE expansion eliminates the multiplier for $l_2$ cost function using low-complexity recursive equations.

Some exemplary embodiments of the disclosed technology provide a fast SE expansion for $l_1$ cost function for both real and complex models. The SE expansion eliminates the multiplier and is very simple to implement.

Another embodiment of the disclosed technology provides a complex SE expansion method for $l_2$ norm cost that generates the first 9 complex SE expansions with some simple conditions. By checking the conditions, the first 9 complex SE expansions can be uniquely determined, and the checking equations only require shifting and addition operations, which may be easily implemented in hardware.

These and other aspects of the disclosed technology are described in the Detailed Description disclosed below and the accompanying figures. Other aspects and features of embodiments of the disclosed technology will become apparent to those of ordinary skill in the art upon reviewing the following description of specific, exemplary embodiments of the disclosed technology in concert with the figures. While features of the disclosed technology may be discussed relative to certain embodiments and figures, all embodiments of the disclosed technology can include one or more of the features discussed herein. While one or more embodiments may be discussed as having certain advantageous features, one or more of such features may also be used with the various embodiments of the disclosed technology discussed herein. In similar fashion, while exemplary embodiments may be discussed below as system or method embodiments, it is to be understood that such exemplary embodiments may be implemented in various devices, systems, and methods of the disclosed technology.

BRIEF DESCRIPTION OF THE DRAWINGS

The following Detailed Description technology is better understood when read in conjunction with the appended drawings. For the purposes of illustration, there is shown in the drawings exemplary embodiments, but the subject matter is not limited to the specific elements and instrumentalities disclosed.

DETAILED DESCRIPTION

To facilitate an understanding of the principles and features of the disclosed technology, various illustrative embodiments are explained below. In particular, the disclosed technology is described in the context of systems and methods for MIMO communication systems. Certain embodiments of the disclosed technology may be applied to many wireless MIMO communication system standards known in the art, including, but not limited to, IEEE 802.11 (Wi-Fi), 4G, 3GPP, Long Term Evolution, Wi-MAX, HSPA+, and the like. Embodiments of the disclosed technology, however, are not limited to use in wireless MIMO communication systems. Rather, embodiments of the disclosed technology can be used for processing other MIMO communication systems, including, but not limited to, optical MIMO systems or other transmission systems having an architecture incorporating multiple transmitters and/or multiple transceivers.

The components described hereinafter as making up various elements of the disclosed technology are intended to be illustrative and not restrictive. Many suitable components or steps that would perform the same or similar functions as the components or steps described herein are intended to be embraced within the scope of the disclosed technology. Such other components or steps not described herein can include, but are not limited to, for example, similar components or steps that are developed after development of the disclosed technology.

Figure 1:
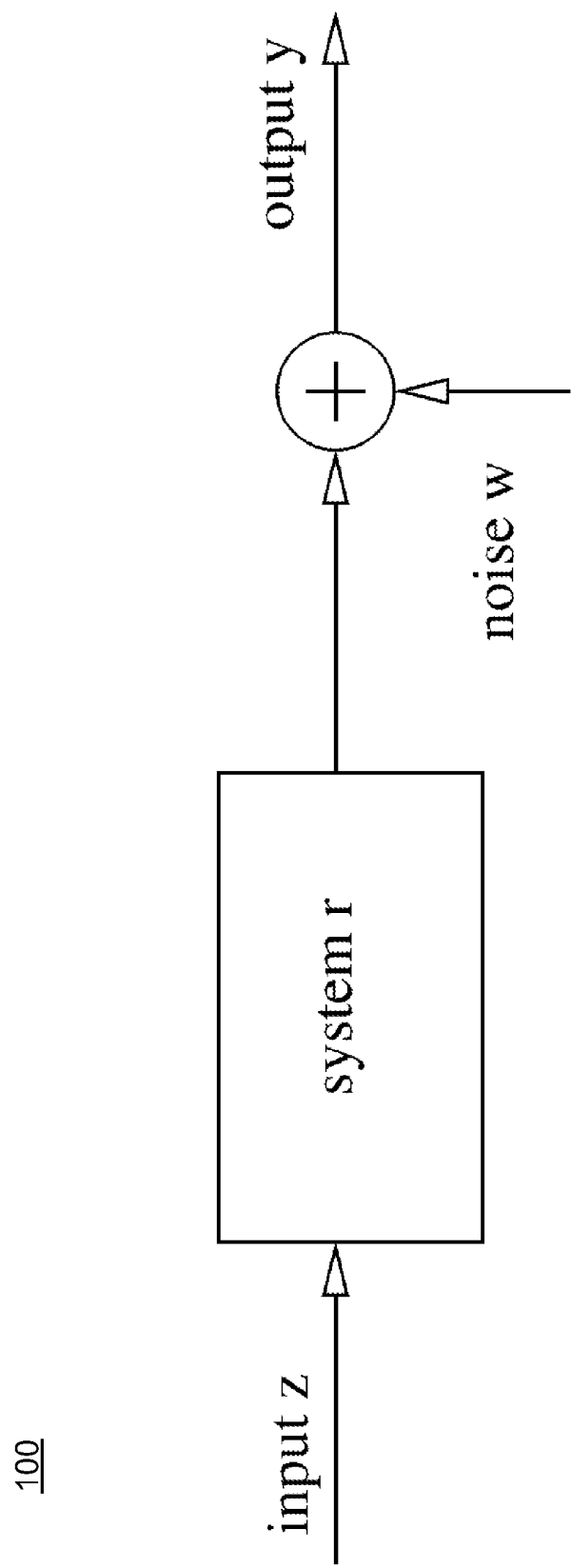
FIG. 1 provides a block diagram of a system model, in accordance with an exemplary embodiment of the disclosed technology.

FIG. 1 illustrates a system model 100 according to one embodiment of the disclosed technology. The system model 100 may include an input z, a system r, and an output y. In one embodiment, the SE method may have a mathematical representation as provided in the following equation:

$$c = |y - rz|^p, \quad (1)$$

where y and $r \neq 0$ may be known real numbers, z may be an unknown integer parameter, c may represent the cost of the SE algorithm, and integer p may denotes the $l_p$-norm. When p=1, the above equation may compute an $l_1$-norm cost. When p=2, the above equation may compute an $l_2$-norm cost. The methods described herein may be applicable to other values of p. In some embodiments, there may exist a sequence of all possible z, i.e., $\{z^{(1)}, z^{(2)}, \ldots\}$ ($z^{(n)} \neq z^{(m)}, \forall n \neq m$), costs for all possible z may be disclosed by $\{c^{(n)} = (y - rz^{(n)})^2\}_{n=1}^{\infty}$ where costs are arranged in an ascend order such that $c^{(1)} < c^{(2)} < \ldots$.

Given r and y, the SE method disclosed herein may find K best candidates z in a fast way. For instance, the SE method may find the top k z's, i.e., $\{z^{(n)}\}_{n=1}^{k}$ such that their corresponding costs $\{c^{(n)}\}_{n=1}^{k}$ are smallest in a sequential way.

1. Conventional SE Method
1.1 Real Case

In real domain, to achieve the goal with low complexity, the SE method may calculate $z^{(n)}$ and $c^{(n)}$ with two stages—the initial stage and the expansion stage. The initial stage of the SE method may obtain $z^{(1)}$ and initializes a step variable $s^{(1)}$ to help determine the next z as $$z^{(1)} = \lfloor y/r \rfloor, \quad (2)$$

$$s^{(1)} = sgn(y/r - z^{(1)}), \quad (3)$$

$$c^{(1)} = |y - rz^{(1)}|^p, \quad (4)$$

where $\lfloor \cdot \rfloor$ denotes the rounding function.

At the expansion stage, the SE method may expand $z^{(n)}$, $n \geq 2$ using the following recursive formula:

$$z^{(n)} = z^{(n-1)} + s^{(n-1)}, \quad (5)$$

$$s^{(n)} = -s^{(n-1)} - sgn(s^{(n-1)}), \quad (6)$$

$$c^{(n)} = |y - rz^{(n)}|^p, \quad (7)$$

where $s^{(n)}$ is a step variable to help determine the next $z^{(n+1)}$.

Table 1 illustrates a conventional SE method. The main complexity of the SE expansion is in Eq. (7). In the conventional SE method, two multipliers are required for p=2 and one multiplier is required for p=1. Since multipliers usually result in much longer latency compared to adders and multiplexers in hardware implementation, especially when the bit width is large, a raw implementation of Eq. (7) can become a critical path that lowers the maximum achievable frequency, i.e., maximum throughput of VLSI implementation.

TABLE 1

Original SE method

| | |
|---|---|
| SE Initialization | |
| Input: | y, r, p |
| Output: | $z^{(1)}$, $s^{(1)}$, $c^{(1)}$ |
| Line 1 | $z^{(1)} = \lfloor y/r \rfloor$ |
| Line 2 | $s^{(1)} = sgn(y/r - z^{(1)})$ |
| Line 3 | $c^{(1)} = |y - rz^{(1)}|^p$ |
| SE Expansion at $z^{(n)}$, n ≥ 2 | |
| Input: | y, r, p, $z^{(n-1)}$, $s^{(n-1)}$ |
| Output: | $z^{(n)}$, $s^{(n)}$, $c^{(n)}$ |
| Line 1 | $z^{(n)} = z^{(n-1)} + s^{(n-1)}$ |
| Line 2 | $s^{(n)} = -s^{(n-1)} - sgn(s^{(n-1)})$ |
| Line 3 | $c^{(n)} = |y - rz^{(n)}|^p$ |

1.2 Complex Case

Unlike the SE expansion in real domain that can be easily computed using recursive equations, existing complex SE methods require a candidate list that contains all possible next expansions. For instance, to find $z^{(n)}$, n>1, existing complex SE method maintains a list of possible SE expansions $\mathcal{L}$ and classifies the expansions into two categories:

Type I, where the imaginary part of $z^{(n)}$ is the same as the imaginary part of $z^{(1)}$.

Type II, otherwise.

If a Type I expansion is chosen as the next expansion of $z^{(n)}$, both the real and imaginary SE expansions may be executed to guarantee that the next smallest solution is in the candidate list $\mathcal{L}$, while for a Type II expansion, only imaginary SE expansion may be used. An example of the existing complex SE method is given in Table 2, where $s^{(n)}$ is an auxiliary variable to help determine the SE expansion in real or imaginary direction.

TABLE 2

Original Complex SE method

| | |
|---|---|
| Complex SE Initialization | |
| Input: | y, r |
| Output: | $\mathcal{L}^{(1)}$ |
| Line 1 | $z = \lfloor y/r \rfloor$ |
| Line 2 | $s = sgn(y/r - z)$ |
| Line 3 | $c = |y - rz|_1$ |
| Line 4 | $\mathcal{L}^{(1)} = \{(z,c,s)\}$ |

Note, for complex arguments, sgn operates independently on the real and imaginary parts.

Complex SE Expansion at $z^{(n)}$, n ≥ 1

| | |
|---|---|
| Input: | $\mathcal{R}[z^{(1)}]$, y, r, $\mathcal{L}^{(n)}$ |
| Output: | $z^{(n)}$, $s^{(n)}$, $c^{(n)}$, $\mathcal{L}^{(n+1)}$ |
| Line 1 | $(z^{(n)}, c^{(n)}, s^{(n)}) = \arg \min_c \forall (z, c, s) \in \mathcal{L}^{(n)}$ |
| Line 2 | $\mathcal{L}^{(n+1)} = \mathcal{L}^{(n)} / \{(z^{(n)}, c^{(n)}, s^{(n)})\}$ |
| Line 3 | $z_1 = z^{(n)} + I[s^{(n)}]j$ |
| Line 4 | $s_1 = \mathcal{R}[s^{(n)}] + (-I[s^{(n)}] - sgn(I[s^{(n)}]))j$ |
| Line 5 | $c_1 = |y - rz_1|_1$ |
| Line 6 | $\mathcal{L}^{(n+1)} = \mathcal{L}^{(n+1)} \cup \{(z_1, s_1, c_1)\}$ |
| Line 7 | If $I[z^{(n)}] = I[z^{(1)}]$ then |
| Line 8 | $z_2 = z^{(n)} + \mathcal{R}[s^{(n)}]$ |
| Line 9 | $s_2 = -\mathcal{R}[s^{(n)}] - sgn(\mathcal{R}[s^{(n)}]) + I[s^{(n)}]j$ |
| Line 10 | $c_2 = |y - rz_2|_1$ |
| Line 11 | $\mathcal{L}^{(n+1)} = \mathcal{L}^{(n+1)} \cup \{(z_2, s_2, c_2)\}$ |
| Line 12 | End if |

Complex SE method has been discussed in L. Zhang, H. Lei, X. Zhang, and D. Yang, "Efficient complex sphere decoding framework for linear dispersion space-time block codes," in Proc. *IEEE Int. Symp. on Personal, Indoor and Mobile Radio Commun.* (*PIMRC*), Athens, Greece, September 2007, pp. 1-4. Complex SE method has also been discussed in M. Mahdavi and M. Shabany, "Novel MIMO detection algorithm for high-order constellations in the complex domain," *IEEE Trans. VLSI Syst.*, vol. 21, no. 5, pp. 834-847, May 2013.

2. Multiplier Reduction 1 (MR1): Updating the Crossing Multiplication Recursively In one aspect, the disclosed technology improves the existing SE method by eliminating or reducing the use of multipliers. According to one embodiment of the disclosed technology, $rz^{(n)}$ in Eq. (7) may be reduced as follows to avoid the use of multipliers. For instance, by introducing an auxiliary variable $A^{(n)} = rz^{(n)}$, $rz^{(n)}$ may be represented by the following recursive equation:

$$\begin{aligned} A^{(n)} &= r(z^{(n-1)} + s^{(n-1)}) \\ &= r(z^{(n-2)} + s^{(n-2)} - s^{(n-2)} - sgn(s^{(n-2)})) \\ &= A^{(n-2)} + r \cdot sgn(s^{(n-1)}), \end{aligned} \quad (8)$$

which is based on the fact that $sgn(s^{(n-2)}) = -sgn(s^{(n-1)})$.

As a result, $c^{(n)}$ may be recursively computed using the following formula $$c^{(n)} = |y - A^{(n)}|^p. \quad (9)$$

Table 3 illustrates one embodiment of the SE method according to the disclosed technology.

TABLE 3

Proposed SE method with MR1
(without early evaluation).

| SE Initialization | |
|---|---|
| Input: | y, r, p |
| Output: | $z^{(1)}, s^{(1)}, c^{(1)}, A^{(0)}, A^{(1)}$ |
| Line 1 | $z^{(1)} = \lceil y/r \rceil$ |
| Line 2 | $s^{(1)} = \text{sgn}(y/r - z^{(1)})$ |
| Line 3 | $A^{(0)} = A^{(1)} = rz^{(1)}$ |
| Line 4 | $c^{(1)} = |y - A^{(1)}|^p$ |
| SE Expansion at $z^{(n)}, j \geq 2$ | |
| Input: | $y, r, p, z^{(n-1)}, s^{(n-1)}, A^{(n-2)}$ |
| Output: | $z^{(n)}, s^{(n)}, c^{(n)}, A^{(n)}$ |
| Line 1 | $z^{(n)} = z^{(n-1)} + s^{(n-1)}$ |
| Line 2 | $s^{(n)} = -s^{(n-1)} - \text{sgn}(s^{(n-1)})$ |
| Line 3 | $A^{(n)} = A^{(n-2)} + r\text{sgn}(s^{(n-1)})$ |
| Line 4 | $c^{(n)} = |y - A^{(n)}|^p$ |

As illustrated in Table 3, at the initial step, $A^{(0)} = A^{(1)} = rz^{(1)}$ may ensure that the SE method described herein reaches the exact solution as the original SE method. In Table 3, lines 3-4 may be regarded as the critical path of the SE expansion, which may lower the maximum frequency.

To shorten the critical path, Table 4 illustrates another embodiment of the SE method where an early evaluation (EE) may be performed on $A^{(n)}$. As shown in Table 4, the early evaluation may be calculated in the initial stage or previous expansions.

TABLE 4

Proposed SE method with MR1
(with early evaluation).

| SE Initialization | |
|---|---|
| Input: | y, r, p |
| Output: | $z^{(1)}, s^{(1)}, c^{(1)}, A^{(2)}, A^{(3)}$ |
| Line 1 | $z^{(1)} = \lceil y/r \rceil$ |
| Line 2 | $s^{(1)} = \text{sgn}(y/r - z^{(1)})$ |
| Line 3 | $A^{(2)} = r(z^{(1)} + s^{(1)})$ |
| Line 4 | $A^{(3)} = r(z^{(1)} - s^{(1)})$ |
| Line 5 | $c^{(1)} = |y - rz^{(1)}|^p$ |
| SE Expansion at $z^{(n)}, j \geq 2$ | |
| Input: | $y, r, p, z^{(n-1)}, s^{(n-1)}, A^{(n)}$ |
| Output: | $z^{(n)}, s^{(n)}, c^{(n)}, A^{(n+2)}$ |
| Line 1 | $z^{(n)} = z^{(n-1)} + s^{(n-1)}$ |
| Line 2 | $s^{(n)} = -s^{(n-1)} - \text{sgn}(s^{(n-1)})$ |
| Line 3 | $A^{(n+2)} = A^{(n)} + r\text{sgn}(s^{(n-1)})$ |
| Line 4 | $c^{(n)} = |y - A^{(n)}|^p$ |

Figure 2:
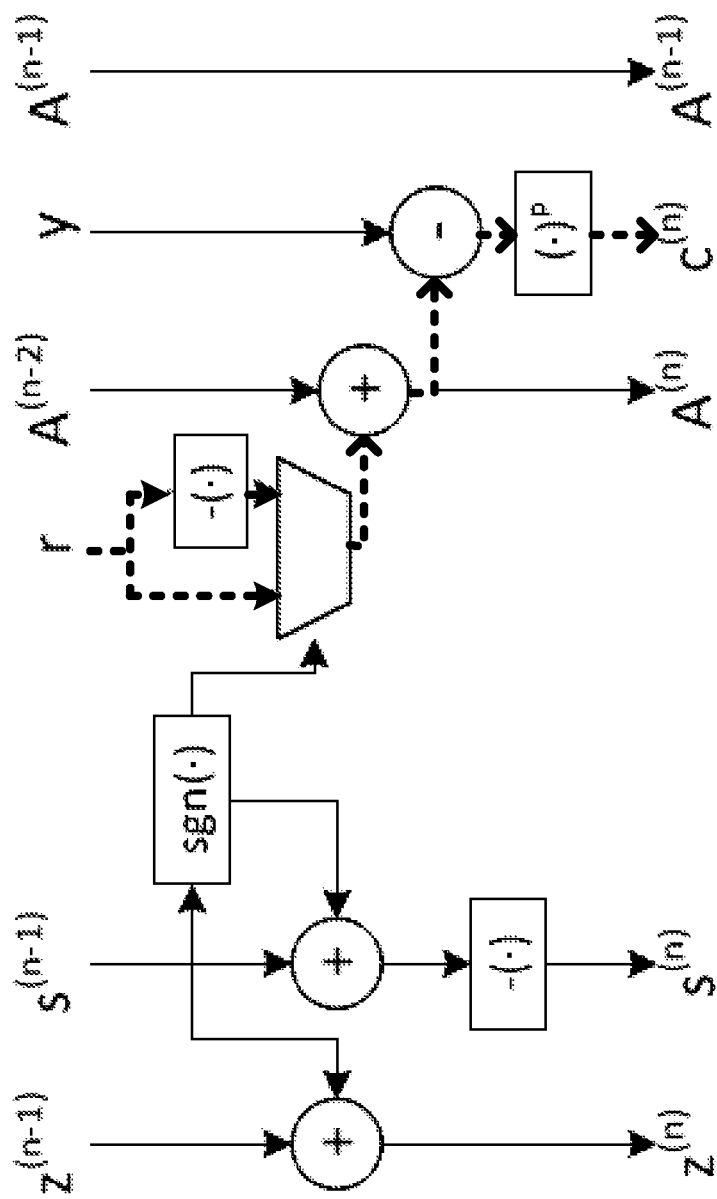
FIG. 2 illustrates a hardware implementation of an SE expansion without early evaluation, in accordance with an exemplary embodiment of the disclosed technology.
Figure 3:
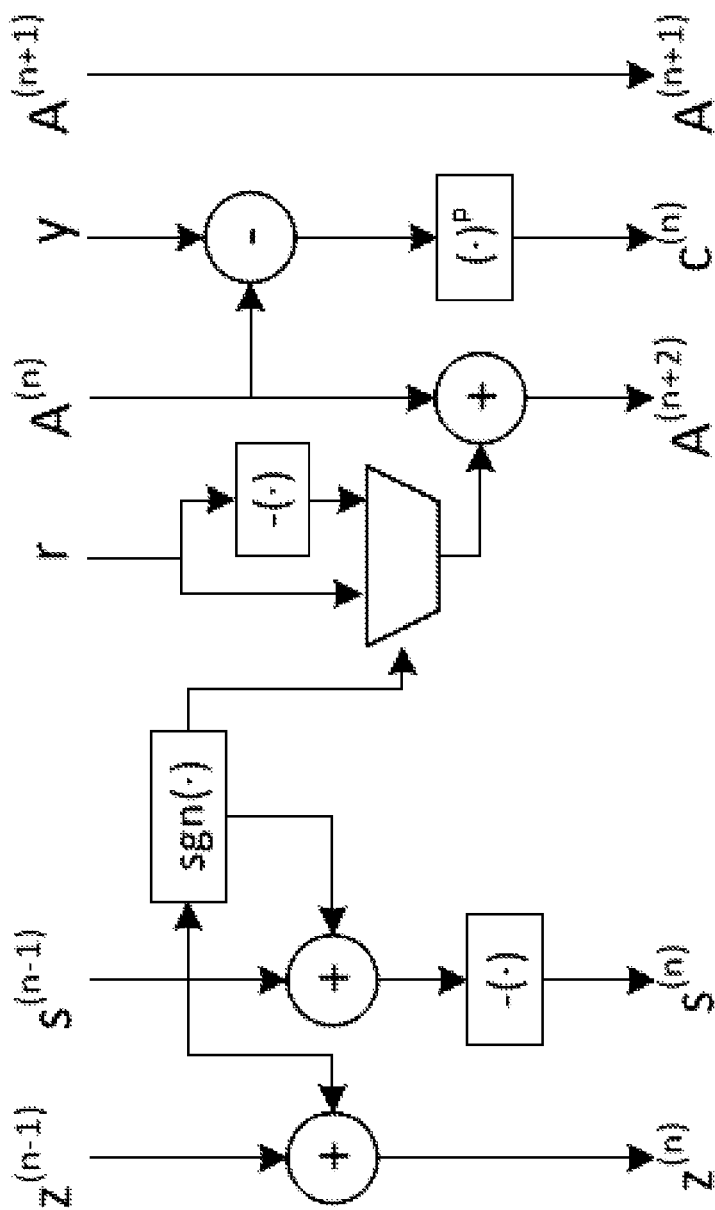
FIG. 3 illustrates a hardware implementation of an SE expansion with early evaluation, in accordance with an exemplary embodiment of the disclosed technology.

The multiplication with $\text{sgn}(s^{(n-1)})$ in Eq. (8) and the absolute operation for p=1 in Eq. (9) may be efficiently implemented without the use of any multiplier. For instance, these operations may be implemented simply by using a multiplexer. Therefore, in this embodiment, for p=1, no multiplier is required for the proposed SE expansion. For instance, FIGS. 2-3 each illustrate an exemplary hardware implementation of the SE method described herein where no multiplier is used. Specifically, FIG. 2 illustrates a hardware implementation of the SE method represented by Table 3 without early evaluation, in which the critical path is indicated by dashed lines. FIG. 3 illustrates a hardware implementation of the SE method represented by Table 4 with early evaluation. As shown in FIGS. 2-3, additional input and output are included, such as $A^{(n-1)}$ in FIG. 2 and $A^{(n+1)}$ in FIG. 3, such that the output may be directly connected to the input of the next (n+1)st expansion without any control code.

Further, for p=2, the number of multipliers may be reduced to one because of the square operation.

Figure 4:
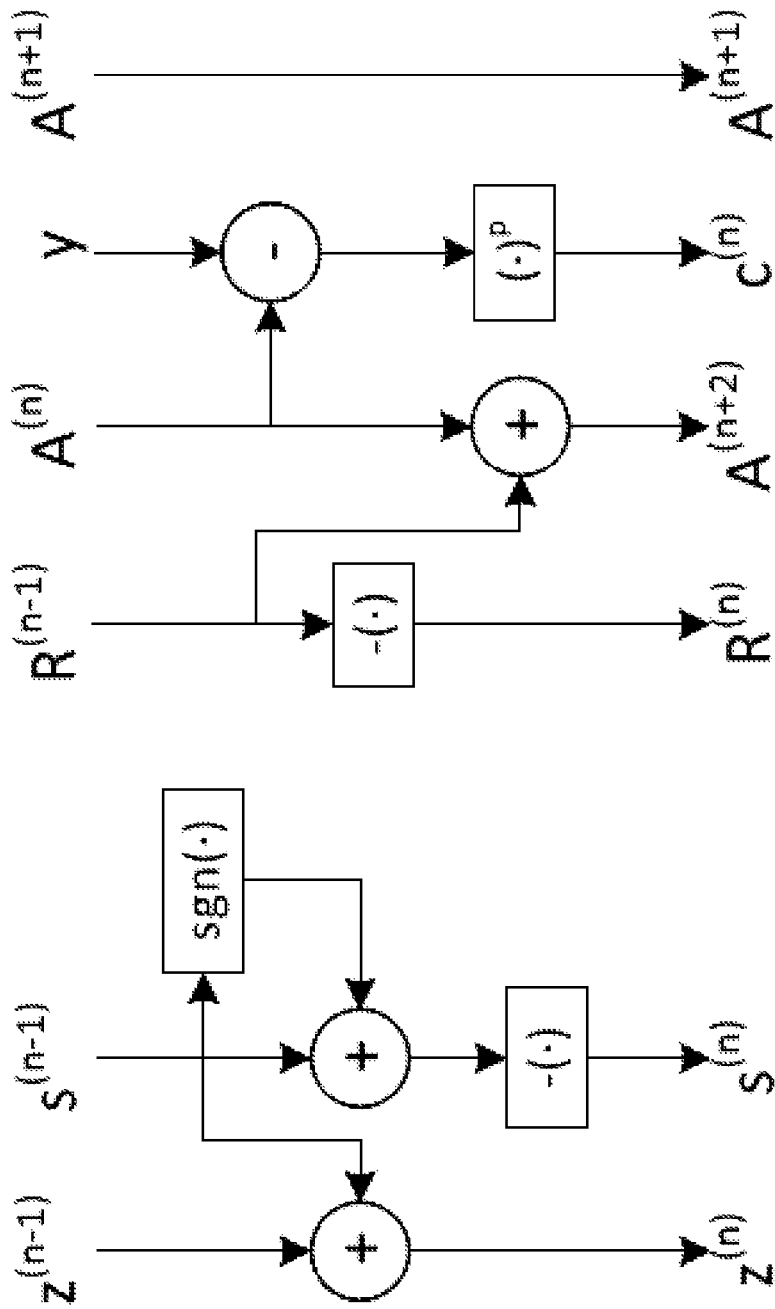
FIG. 4 illustrates another hardware implementation of an SE expansion with early evaluation, in accordance with an exemplary embodiment of the disclosed technology.

In some embodiments, a further improvement of the SE method may reduce the multiplier in $r\,\text{sgn}(s^{(n-1)})$ by defining $R^{(n-1)} = r\,\text{sgn}(s^{(n-1)})$ and using the recursive equation $R(n) = -R(n-1)$. FIG. 4 illustrates an exemplified hardware implementation of the SE expansion in this regard.

3. Multiplier Reduction 2 (MR2): Calculating $l_2$-Norm Recursively

In one aspect, the disclosed technology improves the existing SE method by eliminating the use of multipliers when calculating $l_2$-norm. For instance, the calculation of $l_2$-norm based on Eq. (7) with p=2 may be disclosed as follows:

$$\begin{aligned} c^{(n)} &= (y - rz^{(n-1)} - rs^{(n-1)})^2 \\ &= (y - rz^{(n-2)} - r\text{sgn}(s^{(n-1)}))^2 \\ &= (y - rz^{(n-2)})^2 + r^2 - \text{sgn}(s^{(n-1)})(2ry - 2r^2 z^{(n-2)}) \\ &= c^{(n-2)} + c - 2\text{sgn}(s^{(n-1)})(D - B^{(n-2)}), \end{aligned} \qquad (10)$$

where $B^{(n-2)} = r^2 z^{(n-2)}$, $C = r^2$, and $D = ry$.

Similar to $A^{(n)}$, $B^{(n)}$ may be determined based on the following recursive equation:

$$\begin{aligned} B^{(n)} &= r^2 z^{(n-2)} \\ &= r^2(z^{(n-3)} + s^{(n-3)}) \\ &= r^2(z^{(n-4)} + s^{(n-4)} - s^{(n-4)} - \text{sgn}(s^{(j-n)})) \\ &= B^{(n-2)} + C\text{sgn}(s^{(n-1)}). \end{aligned} \qquad (11)$$

Table 5 illustrates an exemplary pseudo code of the SE method according to this embodiment.

TABLE 5

Proposed SE with MR2 for p = 2

| SE Initialization | |
|---|---|
| Input: | y, r |
| Output: | $z^{(1)}, s^{(1)}, c^{(0)}, c^{(1)}, B^{(0)}, B^{(1)}, C, D$ |
| Line 1 | $z^{(1)} = \lceil y/r \rceil$ |
| Line 2 | $s^{(1)} = \text{sgn}(y/r - z^{(1)})$ |
| Line 3 | $B^{(0)} = B^{(1)} = r^2 z^{(1)}$ |
| Line 4 | $c^{(0)} = c^{(1)} = (y - rz^{(1)})^2$ |
| Line 5 | $C = r^2$ |
| Line 6 | $D = ry$ |
| SE Expansion at $z^{(j)}, j \geq 2$ | |
| Input: | $z^{(n-1)}, s^{(n-1)}, c^{(n-2)}, B^{(n-2)}, C, D$ |
| Output: | $z^{(n)}, s^{(n)}, c^{(n)}, B^{(n)}$ |
| Line 1 | $z^{(n)} = z^{(n-1)} + s^{(n-1)}$ |
| Line 2 | $s^{(n)} = -s^{(n-1)} - \text{sgn}(s^{(n-1)})$ |
| Line 3 | $B^{(n)} = B^{(n-2)} + C\text{sgn}(s^{(n-1)})$ |
| Line 4 | $c^{(n)} = c^{(n-2)} + C - 2\text{sgn}(s^{(n-1)})(D - B^{(n-2)})$ |

In Table 5, for the initial step, $B^{(0)} = B^{(1)} = r^2 z^{(1)}$ and $c^{(0)} = c^{(1)}$ may yield the same results as the original SE method in Eqs. (2)-(7).

Figure 5:
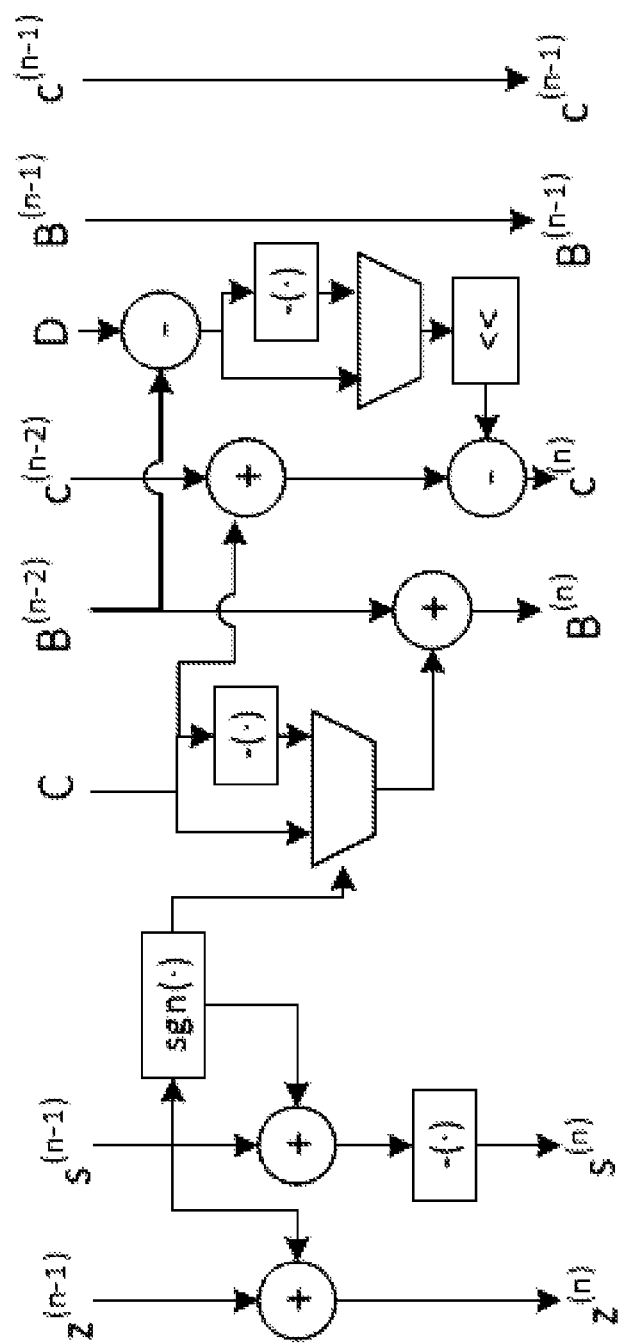
FIG. 5 illustrates yet another hardware implementation of an SE expansion, in accordance with an exemplary embodiment of the disclosed technology.

Further, as illustrated in Table 5, $C = r^2$ and $D = ry$ may be constants in the expansion stage, and their values may be pre-computed in the initialization stage. Further, as illustrated in Table 5, the multiplication with 2 may be implemented using a shift register without any multiplier. As a result, this embodiment of the SE expansion method may not require any multiplier in calculating $c^{(n)}$ and $B^{(n)}$ for p=2. FIG. 5 illustrates a hardware implementation of the SE expansion according to this embodiment where no multiplier is used therein.

In another embodiment, the $l_2$-norm may be calculated as follows:

$$c^{(n)} = y^2 - 2yrz^{(n)} + r^2(z^{(n)})^2 \quad (12)$$
$$= y^2 - E^{(n)} + F^{(n)},$$

where $E^{(n)} = 2yrz^{(n)}$ and $F^{(n)} = r^2(z^{(n)})^2$, both of which can be recursively updated according to the following formulas:

$$E^{(n)} = 2yr(z^{(n-2)} + \text{sgn}(s^{(n-1)})) \quad (13)$$
$$= E^{(n-2)} + 2D\text{sgn}(s^{(n-1)}),$$

$$F^{(n)} = r^2(z^{(n-2)} + \text{sgn}(s^{(n-1)}))^2 \quad (14)$$
$$= r^2(z^{(n-2)})^2 + 2r^2 z^{(n-2)}\text{sgn}(s^{(n-1)}) + r^2$$
$$= F^{(n-2)} + 2B^{(n-2)}\text{sgn}(s^{(n-1)}) + C.$$

In this embodiment, the SE method again may be implemented without multipliers. In some aspects, the early evaluation (EE) method may be applied to $E^{(n)}$ and $F^{(n)}$ to reduce the length of critical path.

3.1 Cases for p>2

In some embodiments, for p>2, multipliers may be reduced or eliminated according to similar concept presented above. For example, when p=3, $G^{(n)} = (y-rz^{(n)})^3$ may be introduced and determined as follows:

$$G^{(n)} = (y - rz^{(n-1)} - rs^{(n-1)})^3 \quad (15)$$
$$= (y - rz^{(n-2)} - r\text{sgn}(s^{(n-1)}))^3$$
$$= (y - rz^{(n-2)})^3 - 3(y - rz^{(n-2)})^2 r\text{sgn}(s^{(n-1)}) +$$
$$3(y - rz^{(n-2)})r^2 - (r\text{sgn}(s^{(n-1)}))^3$$
$$= G^{(n-2)} - H^{(n-2)}\text{sgn}(s^{(n-1)}) + 3yr^2 - 3r^3 z^{(n-2)} - r^3 \text{sgn}(s^{(n-1)}),$$

where $H^{(n-2)} = 3(y-rz^{(n-2)})^2 r$, which may be computed in a recursive way similar to SE method discussed above without any multipliers. Therefore, $c^{(n)} = |y-rz^{(n)}|^3 = |E^{(n)}|$ may be computed without any multipliers.

4. Fast Schnorr-Euchner Expansions for $l_1$ Norm 4.1 Real Case

According to one embodiment of the disclosed technology, a fast SE expansion for $l_1$ cost function may be developed based on the following recursive equations:

$$c^{(n)} = c^{(n-2)} + |r| \quad (16)$$

$$z^{(n)} = z^{(n-2)} + \delta^{(n)} \quad (17)$$

with $\delta^{(n)} = \text{sgn}(z^{(n-2)} - z^{(1)}) = -\delta^{(n-1)}$.

Table 6 illustrates an exemplified pseudo code of the SE method according to this embodiment. In this embodiment, the SE expansion method may eliminate the multiplier and is very simple to implement.

TABLE 6

Proposed Fast SE for cost.

| SE Initialization | |
| --- | --- |
| Input: | y, r |
| Output: | $z^{(0)}, z^{(1)}, c^{(0)}, c^{(1)}, \delta^{(1)}$ |
| Line 1 | $z^{(0)} = z^{(1)} = \lceil y/r \rfloor$ |
| Line 2 | $\delta^{(1)} = \text{sgn}(z^{(1)} - y/r)$ |
| Line 3 | $c^{(1)} = \mid y - rz^{(1)} \mid$ |
| Line 4 | $c^{(0)} = -c^{(1)}$ |
| SE Expansion at $z^{(j)}$, $j \geq 2$ | |
| Input: | $r, z^{(n-2)}, z^{(n-1)}, c^{(n-2)}, c^{(n-1)}, \delta^{(n-1)}$ |
| Output: | $z^{(n-1)}, z^{(n)}, c^{(n-1)}, c^{(n)}, \delta^{(n)}$ |
| Line 1 | $\delta^{(n)} = -\delta^{(n-1)}$ |
| Line 2 | $z^{(n)} = z^{(n-1)} + \delta^{(n)}$ |
| Line 3 | $c^{(n)} = c^{(n-2)} + \mid r \mid$ |

As illustrated in Table 6, for the initialization, with $z^{(0)} = \lceil y/r \rfloor$ and $c^{(0)} = -|y-rz^{(1)}|$, the SE method may yield the exactly same sequence of $z^{(j)}$ and $c^{(j)}$ as the original SE method.

Table 7 illustrates an exemplified pseudo code of the SE method using early evaluation. Here, the performance of the SE method may be improved by performing early evaluation on $z^{(n)}$ by calculating $\delta^{(n)}$ in earlier stage.

TABLE 7

Proposed Fast SE for $l_1$ cost with early evaluation.

| SE Initialization | |
| --- | --- |
| Input: | y, r |
| Output: | $z^{(0)}, z^{(1)}, c^{(0)}, c^{(1)}, \delta^{(2)}$ |
| Line 1 | $z^{(0)} = z^{(1)} = \lceil y/r \rfloor$ |
| Line 2 | $\delta^{(2)} = \text{sgn}(y/r - z^{(1)})$ |
| Line 3 | $c^{(1)} = \mid y - rz^{(1)} \mid$ |
| Line 4 | $c^{(0)} = -c^{(1)}$ |
| SE Expansion at $z^{(j)}$, $j \geq 2$ | |
| Input: | $r, z^{(n-2)}, z^{(n-1)}, c^{(n-2)}, c^{(n-1)}, \delta^{(n)}$ |
| Output: | $z^{(n-1)}, z^{(n)}, c^{(n-1)}, c^{(n)}, \delta^{(n+1)}$ |
| Line 1 | $\delta^{(n+1)} = -\delta^{(n)}$ |
| Line 2 | $z^{(n)} = z^{(n-1)} + \delta^{(n)}$ |
| Line 3 | $c^{(n)} = c^{(n-2)} + \mid r \mid$ |

In some embodiments, by exploiting $\delta^{(n)} = \text{sgn}(z^{(n-2)} - z^{(n-1)})$, $n \geq 3$, $\delta^{(n)}$ may be removed from SE method for $l_1$ cost at the cost of possible longer latency.

4.2 Complex Case

According to one embodiment of the disclosed technology, a complex SE expansion method for $l_1$ norm cost may be implemented in a manner such that by checking some simple conditions, the sequence of SE expansion for $l_1$ cost may be uniquely determined without maintaining the candidate list.

In this embodiment, the cost function may be computed according to the following equation:

$$c = |y - rz|_1$$
$$= |\mathcal{R}[y] - r\mathcal{R}[z]| + |I[y] - rI[z]|,$$

Where y may be a complex number, $r \neq 0$ is a real number, z is an unknown Gaussian integer in the form of $\mathbb{Z} + j\mathbb{Z}$, $\mathbb{Z}$ is the integer set, $j = \sqrt{-1}$, c is the cost, and $\mathcal{R}[\cdot]$ and $I[\cdot]$ denote the real and imaginary parts of a variable, respectively.

The first SE solution may be obtained as $$z^{(1)}=[y/r],$$

$$c^{(1)}=|y-rz^{(1)}|_1,$$

In this embodiment, by denoting $\Delta_1=|\mathcal{R}[y]-r\mathcal{R}[z^{(1)}]|$, $\Delta_2=|I[y]-rI[z^{(1)}]|$, $\delta_1=\text{sgn}(\mathcal{R}[y]/r-\mathcal{R}[z^{(1)}])$, and $\delta_2=\text{sgn}(I[y]/r-rI[z^{(1)}])$, SE solutions may be computed according to the following propositions.

Proposition 1

The 2nd and 3rd SE solutions may be determined as $$z^{(2)} = \begin{cases} z^{(1)} + \delta_1, & \text{if } \Delta_1 > \Delta_2 \\ z^{(1)} + \delta_2 j, & o.w. \end{cases} \quad (18)$$

$$c^{(2)} = \begin{cases} |r| - \Delta_1 + \Delta_2, & \text{if } \Delta_1 > \Delta_2 \\ \Delta_1 + |r| - \Delta_2, & o.w. \end{cases} \quad (19)$$

$$z^{(3)} = \begin{cases} z^{(1)} + \delta_2 j, & \text{if } \Delta_1 > \Delta_2 \\ z^{(1)} + \delta_1, & o.w. \end{cases} \quad (20)$$

$$c^{(3)} = \begin{cases} \Delta_1 + |r| - \Delta_2, & \text{if } \Delta_1 > \Delta_2 \\ |r| - \Delta_1 + \Delta_2, & o.w. \end{cases} \quad (21)$$

Figure 6:
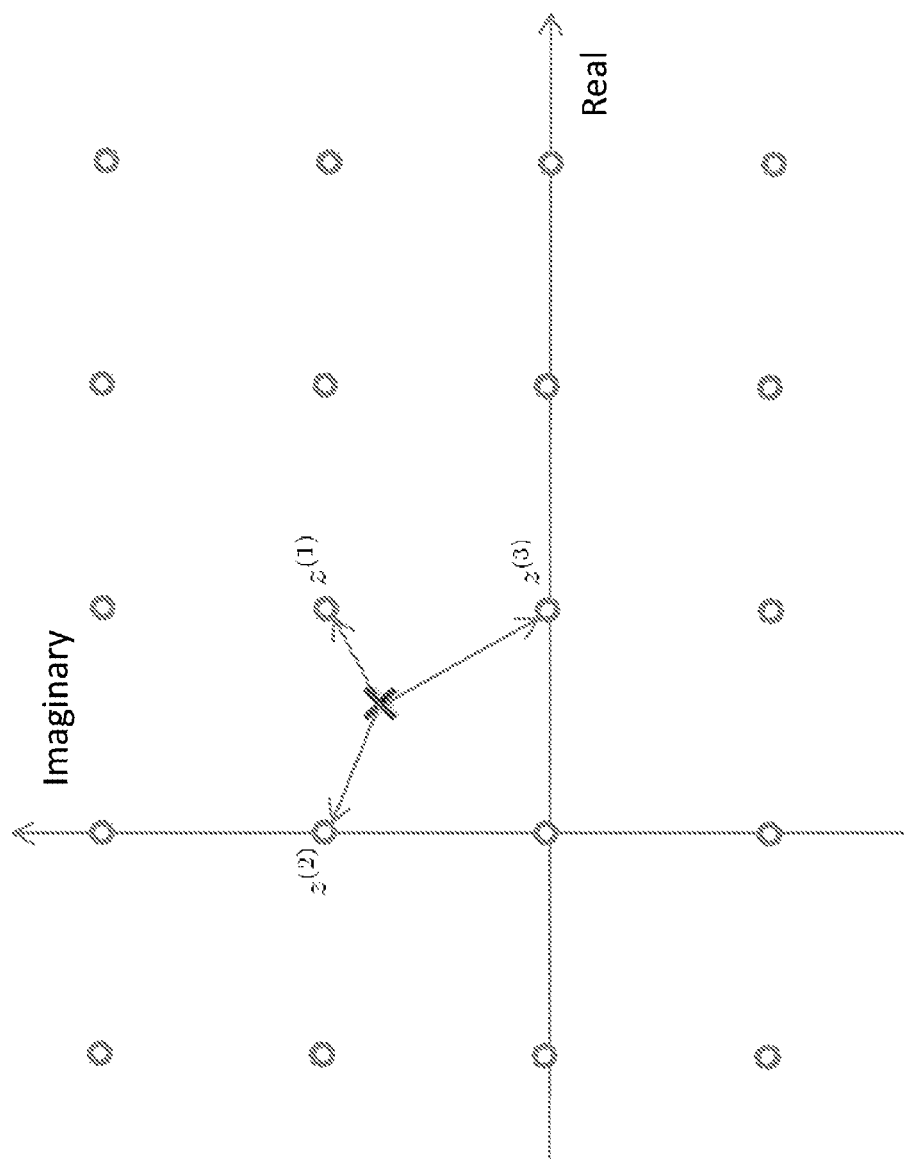
FIG. 6 illustrates 2nd and 3rd SE solutions, in accordance with an exemplary embodiment of the disclosed technology.

FIG. 6 illustrates the 2nd and 3rd SE solutions determined according to Proposition 1. In FIG. 6, × denotes y/r.

Proposition 2

If $|r|<2\Delta_1+2\Delta_2$, the 4th SE solution may be determined by $$z^{(4)}=z^{(1)}+\delta_1+\delta_2 j, \quad (22)$$

$$c^{(4)}=2|r|-\Delta_1-\Delta_2, \quad (23)$$

and the 5th and 6th SE solutions are in the set $$z^{(5)},z^{(6)} \in \{z^{(1)}-\delta_1, z^{(1)}-\delta_2 j\} \quad (24)$$

with the same cost $|r|+\Delta_1+\Delta_2$. Otherwise, if $|r|>2\Delta_1+2\Delta_2$, the 4th and 5th SE solutions are in the set $$z^{(4)},z^{(5)} \in \{z^{(1)}-\delta_1, z^{(1)}-\delta_2 j\} \quad (25)$$

with the cost $|r|+\Delta_1+\Delta_2$, and the 6th SE solution is given by $$z^{(6)}=z^{(1)}+\delta_1+\delta_2 j, \quad (26)$$

$$c^{(6)}=2|r|-\Delta_1-\Delta_2. \quad (27)$$

Figure 7:
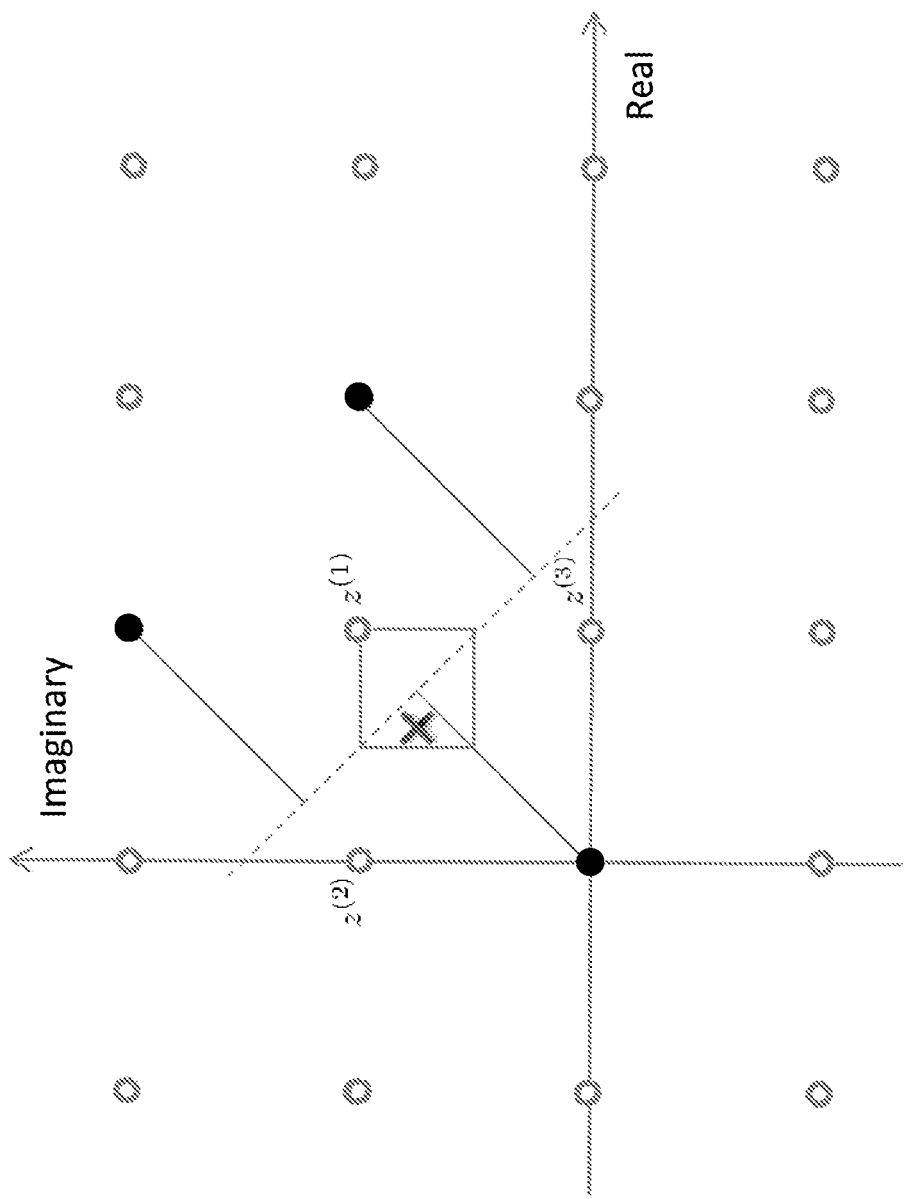
FIG. 7 illustrates a decision boundary of 4th, 5th and 6th SE solutions, in accordance with an exemplary embodiment of the disclosed technology.

FIG. 7 provides an illustration of the decision boundary $|r|<2\Delta_1+2\Delta_2$ according to this embodiment, where the possible solutions are shown by solid circles and x sign.

A sequence of complex SE expansions for $l_1$ norm based on the conditions $\Delta_1 \gtrless \Delta_2$ and $|r| \gtrless 2\Delta_1+2\Delta_2$ may be determined.

Proposition 3

If $|r|<2\Delta_1+2\Delta_2$, the sequence of complex SE expansions may be determined by $$z^{(1)},z^{(2)},z^{(3)},z^{(4)}, \quad \text{layer 1}$$

$$\{z^{(1)}-\delta_1,z^{(1)}-\delta_2 j\},\{z^{(2)}+\delta_{2,1},z^{(2)}+\delta_{2,2}j\},$$

$$\{z^{(3)}+\delta_{3,1},z^{(3)}+\delta_{3,2}j\},\{z^{(4)}+\delta_1,z^{(4)}+\delta_2 j\}, \quad \text{layer 2}$$

.
.
.

$$\{z^{(1)}-i\delta_1-k\delta_2 j | \forall i+k=l-1, i\geq 0, k\geq 0\},$$

$$\{z^{(2)}+i\delta_{2,1}+k\delta_{2,2}j | \forall i+k=l-1, i\geq 0, k\geq 0\},$$

$$\{z^{(3)}+i\delta_{3,1}+k\delta_{3,2}j | \forall i+k=l-1, i\geq 0, k\geq 0\},$$

$$\{z^{(4)}+i\delta_1+k\delta_2 j | \forall i+k=l-1, i\geq 0, k\geq 0\}, \quad \text{layer } l$$

.
.
.

and the costs are $$c^{(1)},c^{(2)},c^{(3)},c^{(4)}, \quad \text{layer 1}$$

$$c^{(1)}+|r|,c^{(2)}+|r|,c^{(3)}+|r|,c^{(4)}+|r|, \quad \text{layer 2}$$

.
.
.

$$c^{(1)}+(l-1)|r|,c^{(2)}+(l-1)|r|,c^{(3)}+(l-1)|r|,c^{(4)}+(l-1)|r|, \quad \text{layer } l$$

.
.
.

where the expansions with smaller layers may have smaller cost than those with higher layers, the SE solutions may be grouped in $\{\cdot\}$ if they have the same cost, and $$\delta_{2,1} = \begin{cases} \delta_1, & \text{if } \Delta_1 > \Delta_2 \\ -\delta_1, & o.w. \end{cases} \quad (28)$$

$$\delta_{2,2} = \begin{cases} -\delta_2, & \text{if } \Delta_1 > \Delta_2 \\ \delta_2, & o.w. \end{cases} \quad (29)$$

$$\delta_{3,1} = \begin{cases} -\delta_1, & \text{if } \Delta_1 > \Delta_2 \\ \delta_1, & o.w. \end{cases} \quad (30)$$

$$\delta_{3,2} = \begin{cases} \delta_2, & \text{if } \Delta_1 > \Delta_2 \\ -\delta_2, & o.w. \end{cases} \quad (31)$$

If $|r|>2\Delta_1+2\Delta_2$, the sequence of complex SE expansions may be given by $$z^{(1)}, \quad \text{layer 0}$$

$$z^{(2)},z^{(3)},z^{(4)},z^{(5)},z^{(6)} \quad \text{layer 1}$$

$$\{z^{(2)}+\delta_{2,1},z^{(2)}+\delta_{2,2}j\},\{z^{(3)}+\delta_{3,1},z^{(3)}+\delta_{3,2}j\},$$

$$\{z^{(1)}-2\delta_1,z^{(1)}-\delta_1-\delta_2 j,z^{(1)}-2\delta_2 j\},\{z^{(4)}+\delta_1,z^{(4)}+\delta_2 j\}, \quad \text{layer 2}$$

.
.
.

$$\{z^{(2)}+i\delta_{2,1}+k\delta_{2,2}j | \forall i+k=l-1, i\geq 0, k\geq 0\},$$

$$\{z^{(3)}+i\delta_{3,1}+k\delta_{3,2}j | \forall i+k=l-1, i\geq 0, k\geq 0\},$$

$\{z^{(l)} - i\delta_1 - k\delta_2 j | \forall i+k=l, i\geq 0, k\geq 0\}$, $\{z^{(6)} + i\delta_1 + k\delta_2 j | \forall i+k=l-1, i\geq 0, k\geq 0\}$,   layer l

.
.
.

and the costs are $c^{(1)}$,   layer 0

$c^{(2)}, c^{(3)}, c^{(4)}, c^{(5)}, c^{(6)}$,   layer 1

$c^{(2)}+|r|, c^{(3)}+|r|, c^{(1)}+2|r|, c^{(6)}+|r|$,   layer 2

.
.
.

$c^{(2)}+(l-1)|r|, c^{(3)}+(l-1)|r|, c^{(1)}+l|r|, c^{(6)}+(l-1)|r|$,   layer l

.
.
.

Figure 8:
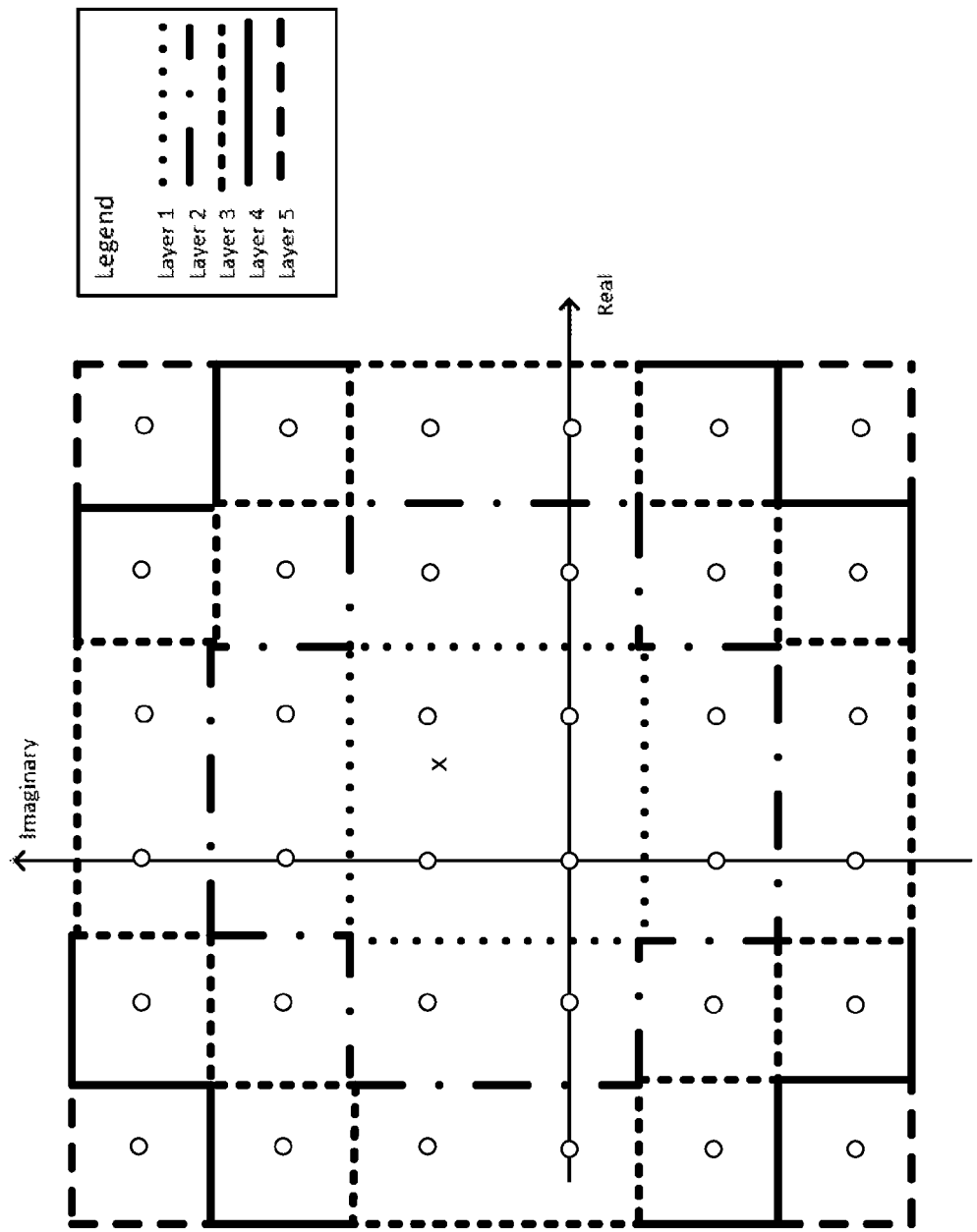
FIG. 8 illustrates layers of SE expansions, in accordance with an exemplary embodiment of the disclosed technology.

FIG. 8 illustrates exemplary layers of SE expansions when $|r|<2\Delta_1+2\Delta_2$ according to this embodiment.

4.3 SE Methods with Bound Constraint

According to some embodiments of the disclosed technology, the value of z may be bounded as follows:

$$c = |y - rz|, s.t., a \leq z \leq b, \quad (32)$$

where a and b are integers indicating the lower and upper bound of z. The disclosed technology may implement the SE method with the bound constraint.

5. Fast SE Expansion for $l_2$ Norm

According to one embodiment of the disclosed technology, a complex SE expansion method for $l_2$ norm cost may generate the first 9 complex SE expansions with some simple conditions. By checking the conditions, the first 9 complex SE expansions may be uniquely determined. The checking equations may only require shifting and addition operations, which are very easy to be implemented in hardware.

In this embodiment, the cost function may be computed according to the following equation:

$$c = |y - rz|^2$$
$$= (\mathcal{R}[y] - r\mathcal{R}[z])^2 + (I[y] - rI[z])^2,$$

Where y may be a complex number, $r \neq 0$ is a real number, z is an unknown Gaussian integer in the form of $\mathbb{Z}+j\mathbb{Z}$, $\mathbb{Z}$ is the integer set, $j=\sqrt{-1}$, c is the cost, and $\mathcal{R}[\cdot]$ and $I[\cdot]$ denote the real and imaginary parts of a variable, respectively.

The first SE solution may be obtained as $$z^{(1)} = [y/r],$$

$$c^{(1)} = |y - rz^{(1)}|^2,$$

To simplify the equations in deriving the following 2nd to 9th SE solutions, denote $\Delta_1 = |\mathcal{R}[y] - r\mathcal{R}[z^{(1)}]|$, $\Delta_2 = |I[y] - rI[z^{(1)}]|$, $\delta_1 = \text{sgn}(\mathcal{R}[y]/r - \mathcal{R}[z^{(1)}])$, and $\delta_2 = \text{sgn}(I[y]/r - I[z^{(1)}])$. The 2nd to 9th SE solutions may be determined according to the following propositions:

Proposition 4

The 2nd and 3rd SE solutions may be determined as $$z^{(2)} = \begin{cases} z^{(1)} + \delta_1, & \text{if } \Delta_1 > \Delta_2 \\ z^{(1)} + \delta_2 j, & o.w. \end{cases} \quad (33)$$

$$c^{(2)} = \begin{cases} (|r| - \Delta_1)^2 + \Delta_2^2, & \text{if } \Delta_1 > \Delta_2 \\ \Delta_1^2 + (|r| - \Delta_2)^2, & o.w. \end{cases} \quad (34)$$

$$z^{(3)} = \begin{cases} z^{(1)} + \delta_2 j, & \text{if } \Delta_1 > \Delta_2 \\ z^{(1)} + \delta_1, & o.w. \end{cases} \quad (35)$$

$$c^{(3)} = \begin{cases} \Delta_1^2 + (|r| - \Delta_2)^2, & \text{if } \Delta_1 > \Delta_2 \\ (|r| - \Delta_1)^2 + \Delta_2^2, & o.w. \end{cases} \quad (36)$$

An illustration of the 2nd and 3rd SE solutions is given in FIG. 6.

Without loss of generality, the following propositions are based on the assumption that $\Delta_1 > \Delta_2$.

Proposition 5

The 4th SE solution is given by $$z^{(4)} = \begin{cases} z^{(1)} + \delta_1 + \delta_2 j, & \text{if } 2\Delta_1 + 4\Delta_2 > |r| \\ z^{(1)} - \delta_2 j, & o.w. \end{cases} \quad (37)$$

$$c^{(4)} = \begin{cases} (|r| - \Delta_1)^2 + (|r| - \Delta_2)^2, & \text{if } 2\Delta_1 + 4\Delta_2 > |r| \\ \Delta_1^2 + (|r| + \Delta_2)^2, & o.w. \end{cases} \quad (38)$$

Figure 9:
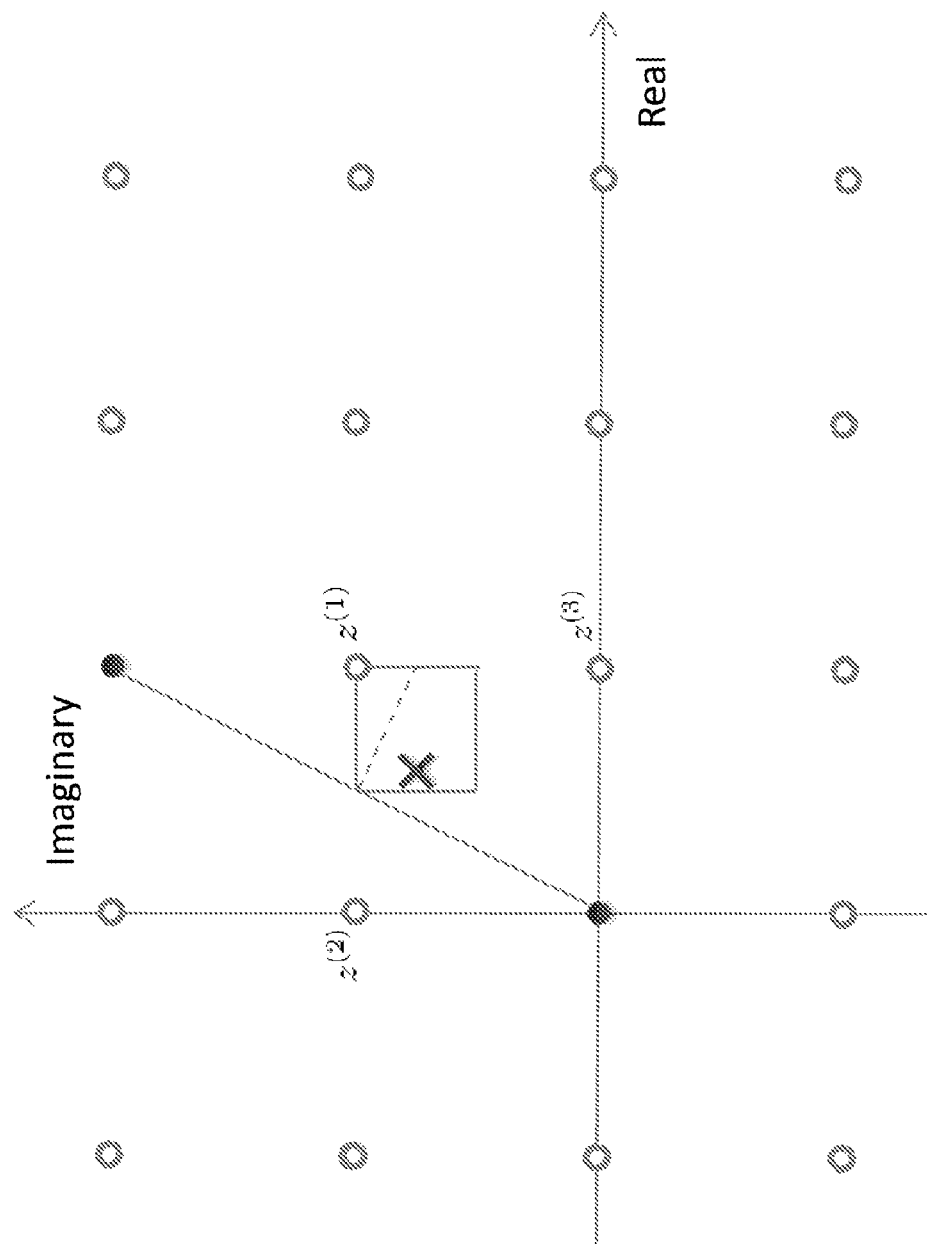
FIG. 9 illustrates a decision boundary of 4th SE solution, in accordance with an exemplary embodiment of the disclosed technology.

FIG. 9 provides an illustration of a decision boundary of the 4th SE solution according to this proposition, where the possible solutions for the 4th are illustrated by x sign.

Proposition 6

If $2\Delta_1 + 4\Delta_2 > |r|$, the 5th SE solution may be determined as $$z^{(5)} = z^{(1)} - \delta_2 j, \quad (39)$$

$$c^{(5)} = \Delta_1^2 + (|r| + \Delta_2)^2, \quad (40)$$

else the 5th SE solution is $$z^{(5)} = \begin{cases} z^{(1)} + \delta_1 + \delta_2 j, & \text{if } 4\Delta_1 + 2\Delta_2 > |r| \\ z^{(1)} - \delta_1, & o.w. \end{cases} \quad (41)$$

$$c^{(5)} = \begin{cases} (|r| - \Delta_1)^2 + (|r| - \Delta_2)^2, & \text{if } 4\Delta_1 + 2\Delta_2 > |r| \\ (|r| + \Delta_1)^2 + \Delta_2^2, & o.w. \end{cases} \quad (42)$$

Figure 10:
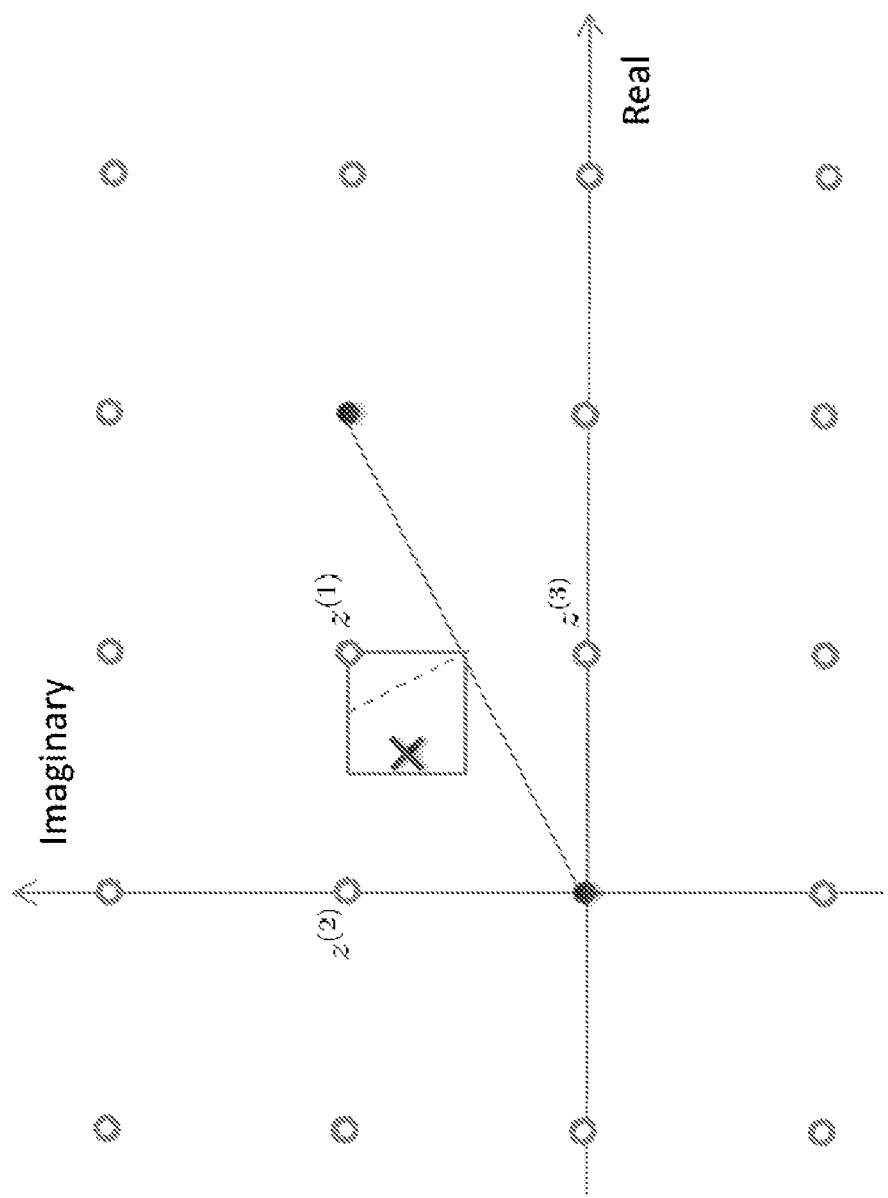
FIG. 10 illustrates a decision boundary of 5th SE solution, in accordance with an exemplary embodiment of the disclosed technology.

FIG. 10 provides an illustration of the 5th SE solution when $2\Delta_1 + 4\Delta_2 < |r|$, where possible solutions for the $5^{th}$ are illustrated by x sign.

Proposition 7

If $4\Delta_1 + 2\Delta_2 < |r|$, the 6th SE solution may be determined as follows:

$$z^{(6)} = z^{(1)} + \delta_1 + \delta_2 j, \quad (43)$$

$$c^{(6)} = (|r| - \Delta_1)^2 + (|r| - \Delta_2)^2, \quad (44)$$

else the 6th SE solution is $$z^{(6)} = \begin{cases} z^{(1)} + \delta_1 + \delta_2 j, & \text{if } 4\Delta_1 + 2\Delta_2 > |r| \\ z^{(1)} - \delta_1, & o.w. \end{cases} \quad (45)$$

$$c^{(6)} = \begin{cases} (|r| - \Delta_1)^2 + (|r| + \Delta_2)^2, & \text{if } 4\Delta_1 + 2\Delta_2 > |r| \\ (|r| + \Delta_1)^2 + \Delta_2^2, & o.w. \end{cases} \quad (46)$$

Figure 11:
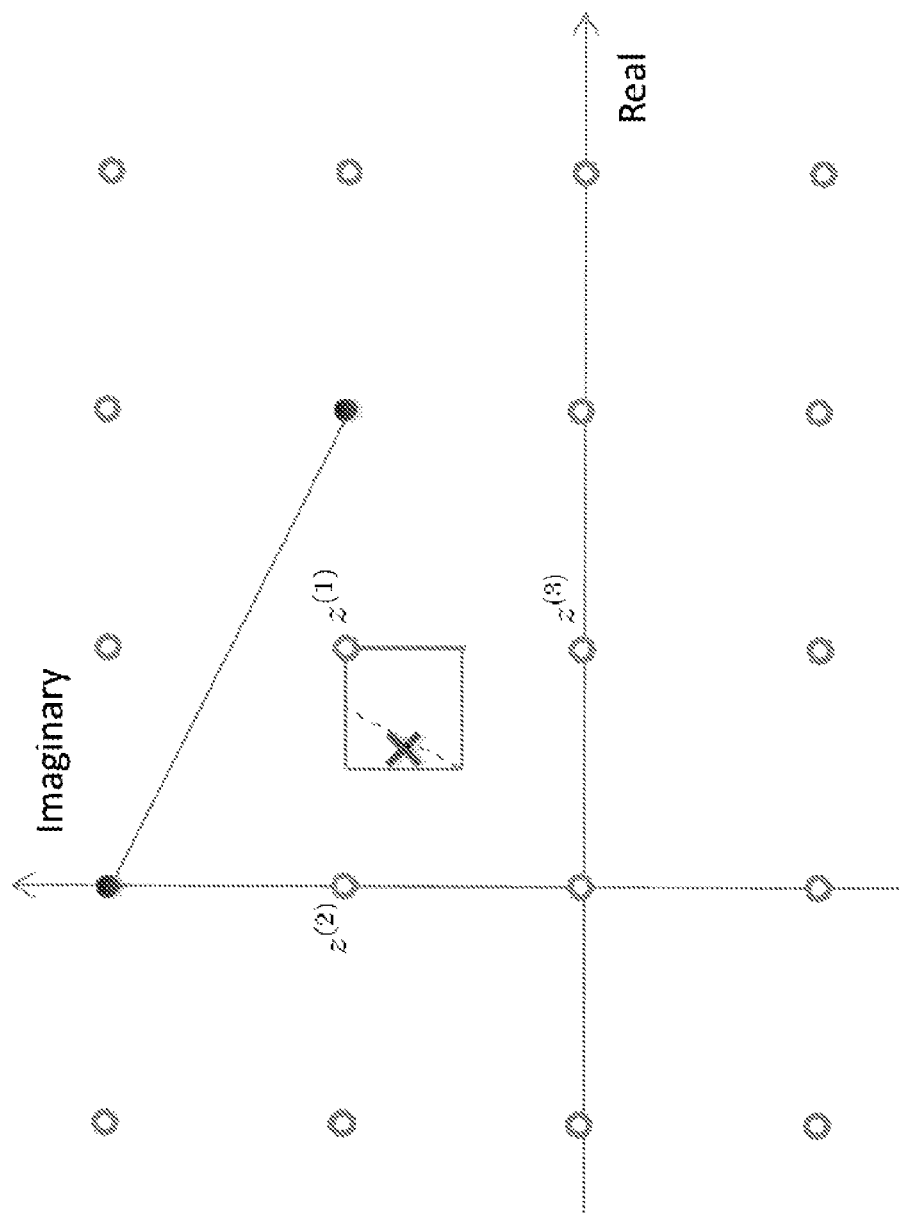
FIG. 11 illustrates a decision boundary of 6th SE solution, in accordance with an exemplary embodiment of the disclosed technology.

FIG. 11 provides an illustration of the 6th SE solution when $4\Delta_1 + 2\Delta_2 > |r|$, where the possible solutions for the $6^{th}$ are illustrated by x sign.

With regard to propositions 4-7, the first 6 SE solutions may be uniquely determined by the following conditions: $\Delta_1 \lessgtr \Delta_2$, $2\Delta_1 + 4\Delta_2 \gtrless |r|$, $4\Delta_1 + 2\Delta_2 \gtrless |r|$, $4\Delta_1 - 2\Delta_2 \gtrless |r|$, and $2\Delta_1 - 4\Delta_2 \gtrless |r|$. According to the disclosed technology, the multiplications with 2 and 4 may be implemented as shifting operations. As such, all these conditions may be efficiently checked in hardware implementation.

Proposition 8

The 7th SE solution may be determined as follows:

$$z^{(7)} = \begin{cases} z^{(1)} - \delta_1, & \text{if } 4\Delta_1 + 2\Delta_2 > |r| \\ z^{(1)} + \delta_1 + \delta_2 j, & o.w. \end{cases} \quad (47)$$

$$c^{(7)} = \begin{cases} (|r| + \Delta_1)^2 + \Delta_2^2, & \text{if } 4\Delta_1 + 2\Delta_2 > |r| \\ (|r| - \Delta_1)^2 + (|r| - \Delta_2)^2, & o.w. \end{cases} \quad (48)$$

Proposition 9

The 8th SE solution may be determined as follows:

$$z^{(8)} = \begin{cases} z^{(1)} + \delta_1, & \text{if } |r| < 3\Delta_1 - \Delta_2 \\ z^{(1)} - \delta_1 + \delta_2 j, & o.w. \end{cases} \quad (49)$$

$$c^{(8)} = \begin{cases} (2|r| - \Delta_1)^2 + \Delta_2^2, & \text{if } |r| < 3\Delta_1 - \Delta_2 \\ (|r| + \Delta_1)^2 + (|r| - \Delta_2)^2, & o.w. \end{cases} \quad (50)$$

Figure 12:
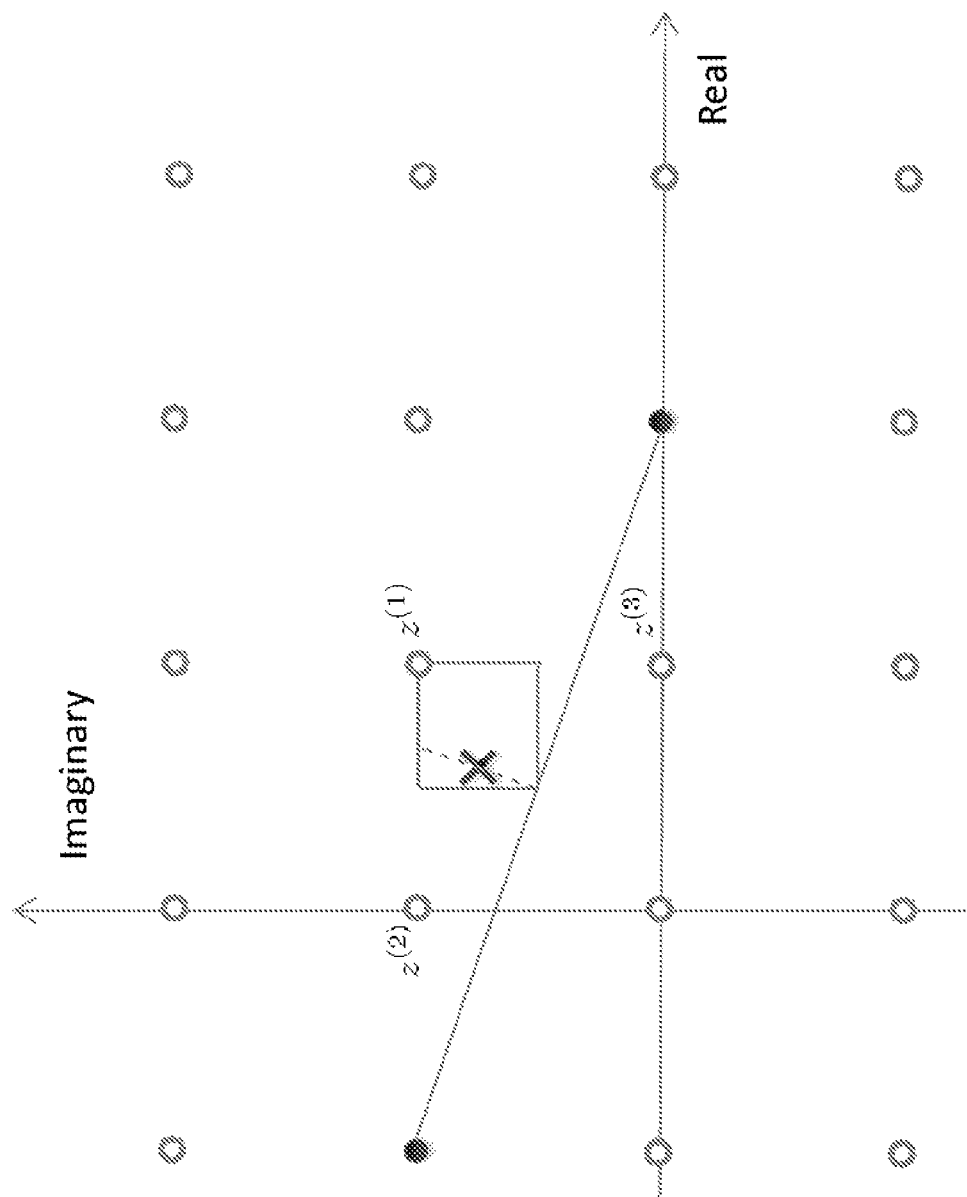
FIG. 12 illustrates a decision boundary of 8th SE solution, in accordance with an exemplary embodiment of the disclosed technology.

FIG. 12 illustrates a decision boundary of the 8th SE solution, where the 7th SE solution is in solid circles, and the possible solutions for the 8th are shown by x sign.

Proposition 10

If $|r| < 3\Delta_1 - \Delta_2$, then the 9th SE solution may be determined as follows:

$$z^{(9)} = z^{(1)} - \delta_1 + \delta_2 j, \quad (51)$$

$$c^{(9)} = (|r| + \Delta_1)^2 + (|r| - \Delta_2)^2, \quad (52)$$

else the 9th SE solution is given by $$z^{(9)} = \begin{cases} z^{(1)} + 2\delta_1, & \text{if } |r| < 3\Delta_1 + \Delta_2 \\ z^{(1)} - \delta_1 - \delta_2 j, & o.w. \end{cases} \quad (53)$$

$$c^{(9)} = \begin{cases} (2|r| - \Delta_1)^2 + \Delta_2^2, & \text{if } |r| < 3\Delta_1 + \Delta_2 \\ (|r| + \Delta_1)^2 + (|r| + \Delta_2)^2, & o.w. \end{cases} \quad (54)$$

Figure 13:
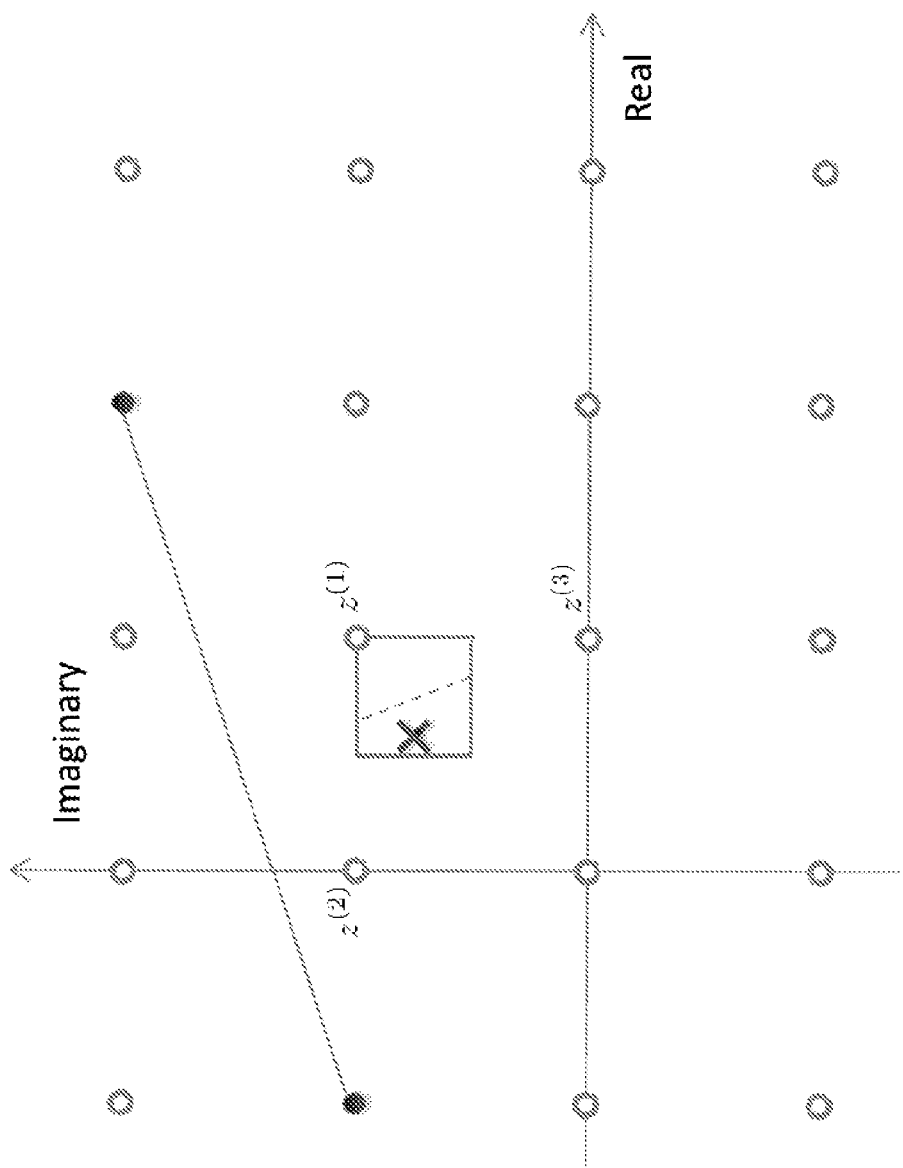
FIG. 13 illustrates a decision boundary of 9th SE solution, in accordance with an exemplary embodiment of the disclosed technology.

FIG. 13 provides an illustration of a decision boundary of the 9th SE solution when $|r| > 3\Delta_1 - \Delta_2$, where the $8^{th}$ SE solution is shown by solid circles, and the possible solutions for the $9^{th}$ are shown by x sign.

It is noted that the disclosed technology described above may be further applied to obtain the kth (k>9) SE solutions.

6 Hardware Implementation and Synthesized Results

Various embodiments of the SE methods of the disclosed technology may be implemented in MIMO communication systems. According to one embodiment of the disclosed technology, the SE methods described herein may be implemented with hardware, such as a VLSI implementation. In some instances, an integrated circuit that implements the SE methods may be part of a MIMO communication system. According to another embodiment of the disclosed technology, the SE methods described herein may be implemented with software on a reconfigurable processor.

In some embodiments of the disclosed invention, the various SE methods may be implemented as logic instructions stored on memory that can be executed by a processor. The instructions can be configured to cause the system to perform the various steps of the various SE methods described herein.

An exemplary embodiment of the disclosed invention may provide a MIMO communication system comprising a plurality of input terminals, a processor, and logic. The various embodiments of the disclosed technology may comprise many types of input terminals capable of receiving an input signal, including, but not limited to, radio-frequency signals, electromagnetic signals, optical signals, and the like. The input terminals can be many input terminals known in the art. In an exemplary embodiment of the disclosed technology, the input terminals comprise antennas. The logic may be stored in memory. The memory may be many types of memory known in the art. In an exemplary embodiment of the disclosed invention, the logic may be stored in a non-transitory computer readable media. In various embodiments of the disclosed invention, the processor may be configured to execute the logic. When executed, the logic may be configured to cause the MIMO system to perform one or more of the steps of the SE methods described herein.

6.1 Implementation for MR1 and MR2

According to some aspects of the disclosed technology, SE methods illustrated in Tables 1-5 may be implemented in Verilog. VLSI implementations of the SE methods may be synthesized on Xilinx XC7VX690T-2FFG1761C FPGA board. The implementations may be synthesized using Xilinx XST. All the methods discussed herein may be implemented in the form of combinatorial logic. Tables 8-9 list the maximum frequencies (1/latencies of all logics) of the SE methods discussed herein after place and route. In Tables 8-9, the fixed-point setting for all real numbers (e.g., $c^{(n)}$, $A^{(n)}$, $B^{(n)}$) are in the form of [a,b], where a is the length of integer bits and b is the length of fractional bits, while the fixed-point setting for all integer numbers (e.g., $z^{(n)}$, $s^{(n)}$) are in the form of [a], where a is the length of integer bits. As shown in Tables 8-9, the proposed SE methods of the disclosed technology have about 2-5 times maximum frequency improvement over the original SE method. As shown in Tables 8-9, for p=1, the maximum frequency of the proposed SE method with MR1 may reach 300 MHz, and for p=2, the maximum frequency of the proposed SE method with MR2 may also reach around 300 MHz.

TABLE 8

Maximum achievable frequency of various SE methods for p = 1.

| Fixed-point setting | Original | MR1 w.o. EE | MR1 with EE | MR2 |
|---|---|---|---|---|
| FP [8, 8] INT [8] | 163.880 MHz | 206.696 MHz | 341.646 MHz | N/A |
| FP [10, 10] INT [10] | 148.942 MHz | 196.96 MHz | 324.254 MHz | N/A |
| FP [16, 16] INT [16] | 118.539 MHz | 202.922 MHz | 288.101 MHz | N/A |

TABLE 9

Maximum achievable frequency of various SE methods for p = 2.

| Fixed-point setting | Original | MR1 w.o. EE | MR1 with EE | MR2 |
|---|---|---|---|---|
| FP [8, 8] INT [8] | 127.080 MHz | 153.139 MHz | 212.404 MHz | 298.685 MHz |
| FP [10, 10] INT [10] | 100.603 MHz | 130.770 MHz | 172.741 MHz | 280.662 MHz |
| FP [16, 16] INT [16] | 63.946 MHz | 98.029 MHz | 118.793 MHz | 320.924 MHz |

6.2 Implementation for $l_1$ Norm

Different SE methods illustrated in Tables 1 and 7 may be implemented in Verilog. The VLSI implementations may be synthesized on Xilinx XC7VX690T-2FFG1761C FPGA board. The implementations may be synthesized using Xilinx XST. All the methods described herein may be implemented in the form of combinatorial logic. Table 10 lists the maximum frequencies (1/latencies of all logics) after place and route. Similar to Tables 8-9, the fixed-point setting for all real numbers (e.g., $c^{(n)}$, $A^{(n)}$, $B^{(n)}$) are in the form of [a,b], where a is the length of integer bits and b is the length of fractional bits, while the fixed-point setting for all integer numbers (e.g., $z^{(n)}$, $s^{(n)}$) are in the form of [a], where a is the length of integer bits. As illustrated in Table 10, the proposed fast $l_1$ SE method has about 3 times maximum frequency improvement over the original SE method. In particular, for p=1, the maximum frequency of the proposed SE method may reach around 400 MHz.

TABLE 10

Maximum achievable frequency of various SE methods.

| Fixed-point setting | Original | Proposed Fast SE |
|---|---|---|
| FP [8, 8] INT [8] | 163.880 MHz | 535.906 MHz |
| FP [10, 10] INT [10] | 148.942 MHz | 442.282 MHz |
| FP [16, 16] INT [16] | 118.539 MHz | 379.75 z |

Figure 14:
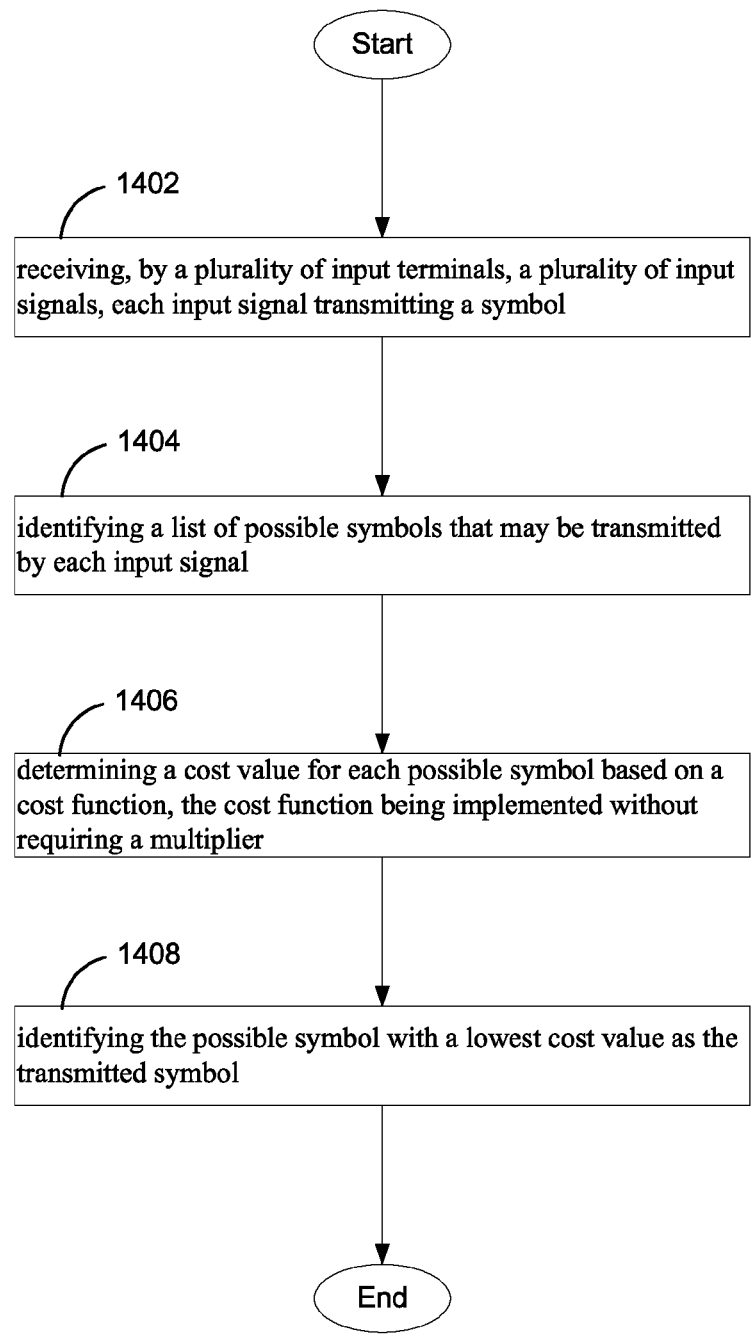
FIG. 14 is a flow diagram of a method, according to an exemplary method of the disclosed technology.

FIG. 14 is a flow-diagram 1400 of an example method, in accordance with an exemplary embodiment of the disclosed technology. In block 1402, the method 1400 may include receiving, by a plurality of input terminals, a plurality of input signals. Each input signal may transmit a symbol. In block 1404, the method 1400 may include identifying a list of possible symbols that may be transmitted by each input signal. In block 1406, the method 1400 may include determining a cost value for each possible symbol based on a cost function. The cost function may be implemented without requiring a multiplier. In block 1408, the method 1400 may include identifying the possible symbol with a lowest cost value as the transmitted symbol.

In one example implementation, the cost function may be an $l_1$ cost function. In another example implementation, the cost function may be an $l_2$ cost function. In some implementations, the cost function may be based on a recursive equation. In some instances, the cost function may have a real domain. In some examples, the cost function may have a complex domain.

In one example implementation, the $l_2$ cost function may generate a first 9 complex SE expansions. The method of the disclosed technology may check conditions for the first 9 complex SE expansions. In some example implementations, the checking conditions may be implemented by shifting and addition operations.

According to some aspects of the disclosed technology, the list of possible symbols may be arranged in an ascending order of their cost values.

In one example implementation, the cost function may have a mathematical representation of $$c=|y-rz|^p,$$

wherein y is the output, r is a system implementing the SE method, z is an input, c is the cost, and an integer p denotes a $l_p$-norm; wherein when p=1, the above equation is an $l_1$ cost function; and wherein when p=2, the above equation is an $l_2$ cost function.

According to some aspects of the disclose technology, multiplication in the cost function may be implemented using a multiplexer. In some instances, multiplication in the cost function may also be implemented using a shift register.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims. For instance, the term "exemplary" used herein does not mean best mode, but rather, example.

Accordingly, those skilled in the art will appreciate that the conception upon which the application and claims are based may be readily utilized as a basis for the design of other structures, methods, and systems for carrying out the several purposes of the embodiments and claims disclosed in this application. It is important, therefore, that the claims be regarded as including such equivalent constructions.

Furthermore, the purpose of the foregoing Abstract is to enable the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

The invention claimed is:

1. A Schnorr-Euchner ("SE") expansion method for a multiple-input multiple-output ("MIMO") communication system that includes a plurality of antennas at a transmitter side and a plurality of antennas at a receiver side, comprising:
receiving, by the plurality of antennas at the receiver side of the MIMO communication system, a plurality of input signals, each input signal containing a symbol;
and identifying a list of first 9 possible symbols that may be contained in each input signal received by each antenna at the receiver side;

checking conditions when identifying $2^{nd}$ to $9^{th}$ possible symbols of the list of the first 9 possible symbols, the checking conditions being implemented by shifting and addition operations;

determining a cost value for each of the first 9 possible symbols based on a cost function, the cost function being implemented without requiring a multiplier;

and identifying the possible symbol with a lowest cost value as the symbol contained in the input signal, wherein the cost function has a mathematical representation of $c=|y-rz|^p$, wherein y is the output, r is a system implementing the SE method, z is an input, c is the cost, and an integer p denotes a $l_p$-norm, wherein p=2.

2. The method of claim 1, wherein the cost function is based on a recursive equation.

3. The method of claim 1, wherein the cost function has a real domain.

4. The method of claim 1, wherein the cost function has a complex domain.

5. The method of claim 1, wherein multiplication in the cost function is implemented using a multiplexer.

6. The method of claim 1, wherein multiplication in the cost function is implemented using a shift register.

7. The method of claim 1, further comprising arranging the list of possible symbols in an ascending order of their cost values.

8. An apparatus implementing a Schnorr-Euchner expansion method without requiring a multiplier for handling signal processing in multiple-input multiple-output signal transmission detection, comprising:

a plurality of antennas each configured to receive a wireless signal; and a processor in connection with the antennas configured to detect a symbol contained in each wireless signal received by each antenna, by:

identifying a list of fist 9 possible symbols that may be contained in the wireless signal; checking conditions when identifying $2^{nd}$ to $9^{th}$ possible symbols of the list of the first 9 possible symbols, the checking conditions being implemented by shifting and addition operations; determining a cost value for each of the fist 9 possible symbols based on a cost function;

and identifying the possible symbol with a lowest cost value as the symbol contained in the wireless signal, wherein the cost function has a mathematical representation of $c=|y-rz|^p$, wherein y is the output, r is a system implementing the SE method, z is an input, c is the cost, and an integer p denotes a $l_p$-norm, wherein p=2.

9. The apparatus of claim 8, wherein the cost function has a real domain.

10. The apparatus of claim 8, wherein the cost function has a complex domain.

11. A multiple-input multiple-output communication system, comprising: a plurality of antennas each configured to receive an input signal; and an integrated circuit implementing a Schnorr-Euchner expansion algorithm without requiring a multiplier, the integrated circuit configured to detect a symbol contained in each input signal received by each antenna, by:

estimating a list of first 9 possible symbols that may be contained in the input signal;

checking condition when identifying $2^{nd}$ to $9^{th}$ possible symbols of the list of the first 9 possible symbols, the checking conditions being implemented by shifting and addition operations;

determining a cost value for each of the first possible symbols based on a cost function; and identifying the possible symbol with a lowest cost value as the symbol contained in the input signal, wherein the cost function has a mathematical representation of $c=|y-rz|^p$, wherein y is the output, r is a system implementing the SE method, z is an input, c is the cost, and an integer p denotes a $l_p$-norm, wherein p=2.

12. The system of claim 11, wherein the cost function has a real domain.

13. The system of claim 11, wherein the cost function has a complex domain.

14. The system of claim 11, wherein multiplication in the cost function is implemented using a multiplexer or a shift register.

* * * * *